US010243403B2

(12) United States Patent
Shichino et al.

(10) Patent No.: US 10,243,403 B2
(45) Date of Patent: Mar. 26, 2019

(54) POWER TRANSMITTING APPARATUS, POWER RECEIVING APPARATUS, WIRELESS POWER TRANSFER SYSTEM, CONTROL METHOD, AND STORAGE MEDIUM

(71) Applicant: CANON KABUSHIKI KAISHA, Tokyo (JP)

(72) Inventors: Takahiro Shichino, Tokyo (JP); Tadashi Eguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 14/889,437

(22) PCT Filed: Jun. 10, 2014

(86) PCT No.: PCT/JP2014/065828
§ 371 (c)(1),
(2) Date: Nov. 5, 2015

(87) PCT Pub. No.: WO2014/208375
PCT Pub. Date: Dec. 31, 2014

(65) Prior Publication Data
US 2016/0094050 A1   Mar. 31, 2016

(30) Foreign Application Priority Data

Jun. 26, 2013 (JP) ................................. 2013-134215

(51) Int. Cl.
*H02J 50/20* (2016.01)
*H02J 50/12* (2016.01)
(Continued)

(52) U.S. Cl.
CPC .............. *H02J 50/12* (2016.02); *H02J 5/005* (2013.01); *H02J 7/025* (2013.01); *H02J 17/00* (2013.01);
(Continued)

(58) Field of Classification Search
CPC .... H02J 5/005; H02J 7/025; H02J 2007/0001; B60L 11/1848; B60L 11/182;
(Continued)

(56) References Cited

U.S. PATENT DOCUMENTS 5,235,406 A   8/1993 Ishii et al.
5,528,227 A   6/1996 Eguchi
(Continued)

FOREIGN PATENT DOCUMENTS

EP   0829940 A2   3/1998
JP   H11-110501 A   4/1999
(Continued)

OTHER PUBLICATIONS

Japanese Office Action dated Feb. 10, 2017 in Japanese Application No. 2013134214.
(Continued)

*Primary Examiner* — Jared Fureman
*Assistant Examiner* — Emmanuel R Dominique
(74) *Attorney, Agent, or Firm* — Venable, LLP

(57) ABSTRACT

A power transmitting apparatus that wirelessly transmits power to one or more power receiving apparatuses determines whether each of the one or more power receiving apparatuses has a function for internally lowering a voltage obtained through power reception, and controls the transmitted power so that, in a case where at least one of the one or more power receiving apparatuses does not have the
(Continued)

function, overvoltage is not applied to the power receiving apparatus that does not have the function.

14 Claims, 20 Drawing Sheets

(51) Int. Cl.
*H02J 50/40* (2016.01)
*H02J 7/02* (2016.01)
*H02J 50/80* (2016.01)
*H02J 17/00* (2006.01)
*H02J 5/00* (2016.01)

(52) U.S. Cl.
CPC .............. *H02J 50/40* (2016.02); *H02J 50/80* (2016.02); *H02J 50/20* (2016.02)

(58) Field of Classification Search
CPC . Y02T 10/7072; Y02T 90/169; Y02T 90/122; Y02T 10/7005; Y02T 90/128; Y02T 90/14; Y02T 90/121; Y02T 90/163; Y04S 30/14
See application file for complete search history.

(56) References Cited

U.S. PATENT DOCUMENTS

| | | | |
|---|---|---|---|
| 5,539,687 A | 7/1996 | Torisawa et al. | |
| 5,708,402 A | 1/1998 | Hachisu et al. | |
| 5,760,525 A | 6/1998 | Hachisu et al. | |
| 5,815,055 A | 9/1998 | Eguchi et al. | |
| 5,917,850 A | 6/1999 | Fujita et al. | |
| 6,020,672 A | 2/2000 | Yokota et al. | |
| 6,321,067 B1 | 11/2001 | Suga et al. | |
| 6,427,065 B1 | 7/2002 | Suga et al. | |
| 7,920,545 B2 | 4/2011 | Eguchi | |
| 8,155,047 B2 | 4/2012 | Eguchi | |
| 8,391,258 B2 | 3/2013 | Shichino | |
| 8,615,192 B2 | 12/2013 | Eguchi | |
| 8,626,074 B2 | 1/2014 | Eguchi | |
| 8,811,364 B2 | 8/2014 | Eguchi | |
| 9,278,454 B2 | 3/2016 | Mimura et al. | |
| 9,558,883 B2 * | 1/2017 | Byun ...................... | H01F 38/14 |
| 2007/0246546 A1 | 10/2007 | Yoshida | |
| 2008/0197802 A1 | 8/2008 | Onishi et al. | |
| 2010/0013320 A1 * | 1/2010 | Shiozaki ................. | H02J 7/025 |
| | | | 307/104 |
| 2010/0123429 A1 | 5/2010 | Chen et al. | |
| 2011/0053500 A1 | 3/2011 | Menegoli et al. | |
| 2011/0196544 A1 | 8/2011 | Baarman et al. | |
| 2011/0260532 A1 | 10/2011 | Tanabe | |
| 2012/0007549 A1 * | 1/2012 | Murayama .............. | H02J 7/025 |
| | | | 320/108 |
| 2012/0267960 A1 | 10/2012 | Low | |
| 2012/0293007 A1 * | 11/2012 | Byun ...................... | H02J 17/00 |
| | | | 307/104 |
| 2012/0306286 A1 | 12/2012 | Kim | |
| 2013/0062959 A1 | 3/2013 | Lee | |
| 2013/0099585 A1 * | 4/2013 | Von Novak ............. | H01F 38/14 |
| | | | 307/104 |
| 2013/0154557 A1 * | 6/2013 | Lee ....................... | H04B 5/0037 |
| | | | 320/108 |
| 2013/0154558 A1 | 6/2013 | Lee et al. | |
| 2013/0170483 A1 | 7/2013 | Shichino | |
| 2014/0035391 A1 * | 2/2014 | Kitani .................... | H02J 5/005 |
| | | | 307/104 |
| 2014/0191568 A1 * | 7/2014 | Partovi .................. | H02J 7/025 |
| | | | 307/9.1 |
| 2015/0028673 A1 | 1/2015 | Uchida | |
| 2015/0097433 A1 | 4/2015 | Shichino | |
| 2016/0006263 A1 | 1/2016 | Shichino | |
| 2016/0013666 A1 | 1/2016 | Uchida | |
| 2016/0072339 A1 | 3/2016 | Shichino | |
| 2016/0087448 A1 | 3/2016 | Takahashi et al. | |
| 2016/0094050 A1 | 3/2016 | Shichino et al. | |
| 2016/0118811 A1 | 4/2016 | Eguchi | |
| 2016/0119884 A1 | 4/2016 | Shichino | |
| 2016/0126749 A1 | 5/2016 | Shichino | |
| 2018/0006465 A1 | 1/2018 | Lee et al. | |

FOREIGN PATENT DOCUMENTS

| | | |
|---|---|---|
| JP | 2006-072966 A | 3/2006 |
| JP | 2009-504116 A | 1/2009 |
| JP | 2010-284006 A | 12/2010 |
| JP | 2011-010384 A | 1/2011 |
| JP | 2012-139010 A | 7/2012 |
| JP | 2013-021894 A | 1/2013 |
| WO | 2013/059330 A1 | 4/2013 |

OTHER PUBLICATIONS

Japanese Office Action dated Mar. 17, 2017 in Japanese Application No. 2013134215.
Japanese Office Action dated Apr. 28, 2017 in Japanese Application No. 2013134214.
Soljacic, Mahn, et al. "Wireless Technology Developed to Transmit Power Lights up a 60W Bulb in Tests", Nikkei Electronics, vol. 966, Dec. 3, 2007, pp. 117 to 129.
U.S. Appl. No. 15/073,425, filed Mar. 17, 2016. Applicant: Takahiro Shichino.

* cited by examiner

FIG. 7

| FIRST THRESHOLD VALUE (700) | SECOND THRESHOLD VALUE (701) |
|---|---|
| 30 | 5 |

FIG. 8

| RECEIVED POWER (800) | LOAD IMPEDANCE RANGE (801) | | MATCHING CIRCUIT ID (802) |
|---|---|---|---|
| | LOWER LIMIT | UPPER LIMIT | |
| NO LESS THAN 9 WATTS BUT LESS THAN 10 WATTS | 2.5 | 2.8 | 1 |
| NO LESS THAN 8 WATTS BUT LESS THAN 9 WATTS | 2.8 | 3.1 | 2 |
| NO LESS THAN 7 WATTS BUT LESS THAN 8 WATTS | 3.1 | 3.6 | 3 |
| NO LESS THAN 6 WATTS BUT LESS THAN 7 WATTS | 3.6 | 4.2 | 4 |
| NO LESS THAN 5 WATTS BUT LESS THAN 6 WATTS | 4.2 | 5.0 | 5 |
| NO LESS THAN 4 WATTS BUT LESS THAN 5 WATTS | 5.0 | 6.3 | 6 |
| NO LESS THAN 3 WATTS BUT LESS THAN 4 WATTS | 6.3 | 8.3 | 7 |
| NO LESS THAN 2 WATTS BUT LESS THAN 3 WATTS | 8.3 | 12.5 | 8 |
| NO LESS THAN 1 WATTS BUT LESS THAN 2 WATTS | 12.5 | 25.0 | 9 |

FIG. 9

| MATCHING CIRCUIT ID 900 | CURRENT OPERATING MODE 901 | NEXT OPERATING MODE 902 | LOAD IMPEDANCE 903 |
|---|---|---|---|
| 4 | 0 | 0 | 3.8 |
| 5 | 0 | 0 | 4.5 |
| 1 | 0 | 1 | 4.5 |
| 5 | 1 | 0 | 4.5 |

904, 905, 906, 907

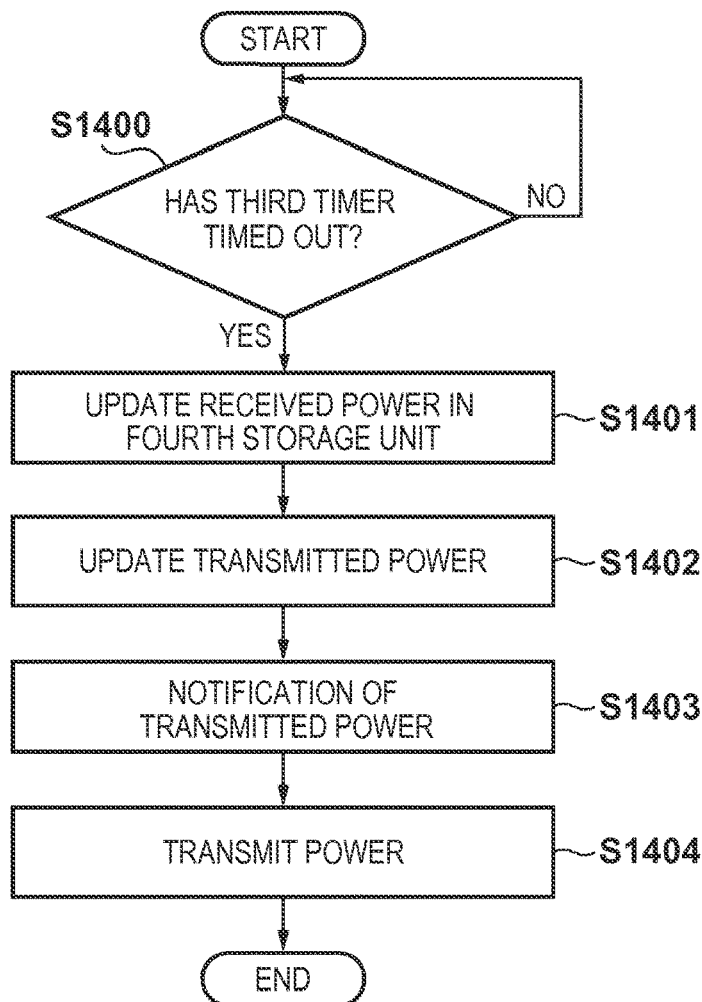

000
POWER TRANSMITTING APPARATUS, POWER RECEIVING APPARATUS, WIRELESS POWER TRANSFER SYSTEM, CONTROL METHOD, AND STORAGE MEDIUM

TECHNICAL FIELD

The present invention relates to wireless power transfer techniques.

BACKGROUND ART

The development of technology for wireless power transfer systems has become widespread in recent years. Japanese Patent Laid-Open No. 2012-139010 discloses a technique for transferring power with high efficiency through impedance matching between a power receiving antenna and a power generating unit that generates DC power.

A case such as that shown in FIGS. 1A and 1B, where power is transmitted from a single power transmitting apparatus to a plurality of power receiving apparatuses, can be considered as an example of the actual operation of a wireless power transfer system. FIG. 10 is a block diagram illustrating an example of the internal configuration of a typical power transmitting apparatus. In FIG. 10, 1000 indicates a constant voltage source that serves as a power source for a class E amp 1001. 1002 indicates a choke coil that prevents power converted to AC by the class E amp 1001 from returning to the DC constant voltage source 1000, whereas 1003 and 1004 indicate resonant capacitors that resonate with a resonant coil 1005. 1006 and 1007 indicate matching elements for a power transmission antenna coil 1008. 1009 indicates a control unit, such as a CPU, that has a function for controlling the constant voltage source, an oscillator 1010 of the class E amp, and so on. In this type of circuit, the CPU adjusts the voltage of the constant voltage source 1000 so that a current required by the class E amp can be supplied from at least one of the outputs of a voltage detection function and a current detection function (not shown) provided in the constant voltage source.

Next, a case where a state has changed from that shown in FIG. 1A, in which a power transmitting apparatus 100 is transmitting power to two power receiving apparatuses 101 and 102, to that shown in FIG. 1B, where the power receiving apparatus 102 has been removed, will be considered. FIG. 11 shows an example of variation in an output voltage of the constant voltage source 1000 and an AC voltage in the power transmission antenna coil in the power transmitting apparatus 100, and variation in an AC voltage of a power receiving antenna coil in the power receiving apparatus 101 that has not been removed, that occur at this time. In FIG. 11, a dotted line indicates a DC output voltage of the constant voltage source 1000 in the power transmitting apparatus 100, a thin solid line indicates the AC voltage at the power transmission antenna coil, and a bold solid line indicates the AC voltage at the power receiving antenna coil of the power receiving apparatus 101 that has not been removed. A state (1) indicates a period in which the two power receiving apparatuses 101 and 102 are receiving power, and a time t0 indicates a time at which the power receiving apparatus 102 is removed. A state (3) indicates a period in which power is being supplied in a stable manner to the power receiving apparatus 101 after the power receiving apparatus 102 has been removed, and a state (2) indicates a period of transition from state (1) to state (3).

While power is being transmitted to the two power receiving apparatuses 101 and 102, the power that was to be supplied to the removed power receiving apparatus 102 becomes a surplus immediately after the time t0 at which the power receiving apparatus 102 is removed, resulting in a state of overvoltage in the power transmission antenna coil and the class E amp of the power transmitting apparatus 100. Because the power transmission current drops due to the power transmitted to the removed power receiving apparatus 102 and the resulting surplus power, the CPU reduces the voltage of the constant voltage source 1000 (a time t1). Thereafter, the CPU adjusts the voltage of the constant voltage source 1000 in accordance with a current value required for transmitting power to the power receiving apparatus 101 that has not been removed (a time t2).

At this time, the AC voltage at the power transmission antenna coil rises as indicated by the thin solid line due to the overvoltage, then begins to drop as the output of the constant voltage source 1000 drops, and is adjusted to the voltage indicated in the stable state (3). Because the power receiving antenna coil of the power receiving apparatus 101 that has not been removed is in a one-to-one relationship with the power transmission antenna coil of the power transmitting apparatus immediately after the power receiving apparatus 102 is removed and thus couples at a mutual inductance m, the voltage at the power reception antenna coil of the power receiving apparatus 101 at this time enters a state of overvoltage. The voltage occurring in the overvoltage state after the power receiving apparatus 102 has been removed is particularly high in the case where the power receiving apparatus 102 that is removed has been receiving a large amount of power and the power receiving apparatus 101 that is not removed has been receiving a small amount of power. In this case, the power receiving antenna coil, a matching element, a rectifier circuit, and so on in the power receiving apparatus 101 that has not been removed, and a constant voltage source connected to the rectifier circuit, may be damaged due to the overvoltage. In addition to cases where power is being transmitted to a plurality of power receiving apparatuses and a power receiving apparatus that is receiving power is removed, the amount of power transmitted from the power transmitting apparatus can also vary drastically due to a driving apparatus such as a motor that is carrying out positional control being switched from a driving state to a stopped state and so on. Accordingly, it has been possible for other power receiving apparatuses to be damaged due to overvoltage in cases where power is being supplied to other apparatuses as well.

Although Japanese Patent Laid-Open No. 2012-139010 attempts to increase the efficiency of wireless power transfer through impedance matching, it does not take into consideration the possibility that an excessive voltage will be input to the power receiving apparatuses as described above.

Having been achieved in light of the aforementioned problems, the present invention prevents an excessive voltage from being inputted to a power receiving apparatus during wireless power transfer.

SUMMARY OF INVENTION

According to one aspect of the present invention, there is provided a power transmitting apparatus that wirelessly transmits power to one or more power receiving apparatuses, the power transmitting apparatus comprising: determination means for determining whether each of the one or more power receiving apparatuses has a function for internally lowering a voltage obtained through power reception; and control means for controlling the transmitted power so that, in a case where at least one of the one or more power receiving apparatuses does not have the function, overvoltage is not applied to the power receiving apparatus that does not have the function.

According to another aspect of the present invention, there is provided a power transmitting apparatus that wirelessly transmits power to one or more power receiving apparatuses, the power transmitting apparatus comprising: determination means for determining whether a request has been received from at least one of the one or more power receiving apparatuses to control the transmitted power so that overvoltage is not applied to the power receiving apparatus that transmitted the request; and control means for controlling the transmitted power so that in a case where the request has been received, the overvoltage is not applied to the power receiving apparatus that transmitted the request.

According to another aspect of the present invention, there is provided a power receiving apparatus that receives power wirelessly from a power transmitting apparatus, the power receiving apparatus comprising: determination means for determining whether the power transmitting apparatus has a function for controlling the transmitted power so that overvoltage is not applied to the power receiving apparatus; and notification means for issuing an error notification in a case where the power transmitting apparatus does not have the function and the power receiving apparatus does not have a function for internally lowering a voltage obtained through the power reception.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

FIG. 7 is a diagram schematically illustrating information stored in a first storage unit according to the first embodiment.

FIG. 8 is a diagram schematically illustrating information stored in a second storage unit according to the first embodiment.

FIG. 9 is a diagram schematically illustrating information stored in a third storage unit according to the first embodiment.

FIG. 14 is a flowchart illustrating processing performed by a power control unit of the power transmitting apparatus according to the first embodiment.

FIG. 15 is a diagram schematically illustrating information stored in a fourth storage unit according to the first embodiment.

DESCRIPTION OF EMBODIMENTS

Exemplary embodiments of the present invention will now be described in detail with reference to the drawings. It should be noted that the relative arrangement of the components, the numerical expressions, and numerical values set forth in the embodiments do not limit the scope of the present invention unless it is specifically stated otherwise.

First Embodiment

System Configuration

Figure 1A:
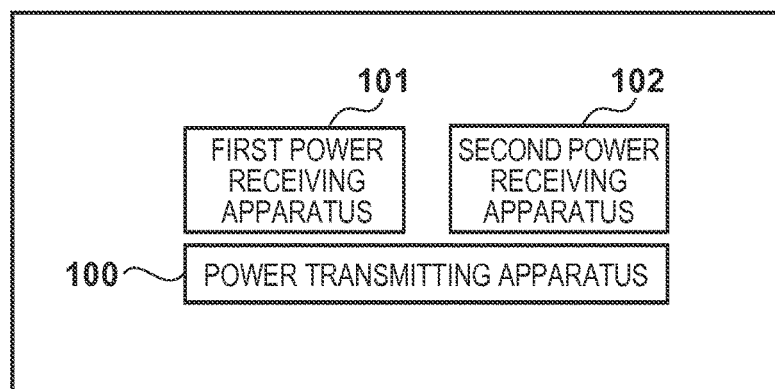
FIGS. 1A and 1B are diagrams illustrating an example of the configuration of a system in which wireless power transfer is performed.
Figure 1B:
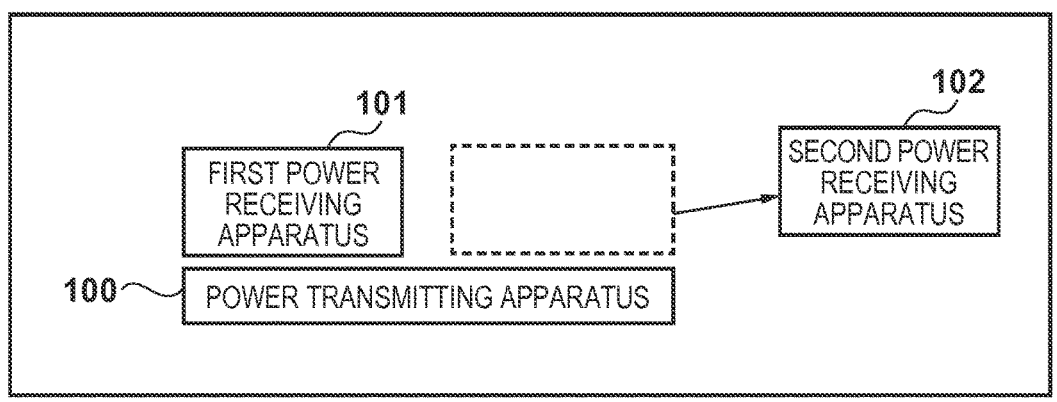

FIGS. 1A and 1B are diagrams illustrating an example of the configuration of a wireless power transfer system that transfers power wirelessly according to the present embodiment. In FIGS. 1A and 1B, 100 indicates a power transmitting apparatus, 101 indicates a first power receiving apparatus, and 102 indicates a second power receiving apparatus. FIG. 1A illustrates a state in which the power transmitting apparatus 100 is transmitting power wirelessly to the first power receiving apparatus 101 and the second power receiving apparatus 102, and the first power receiving apparatus 101 and the second power receiving apparatus 102 receive power wirelessly from the power transmitting apparatus 100. Meanwhile, FIG. 1B illustrates a state in which the second power receiving apparatus 102 is removed by a user or the like and has moved out of a power transmission range (not shown) of the power transmitting apparatus 100 as a result.

Configuration of Power Receiving Apparatus

Figure 2:
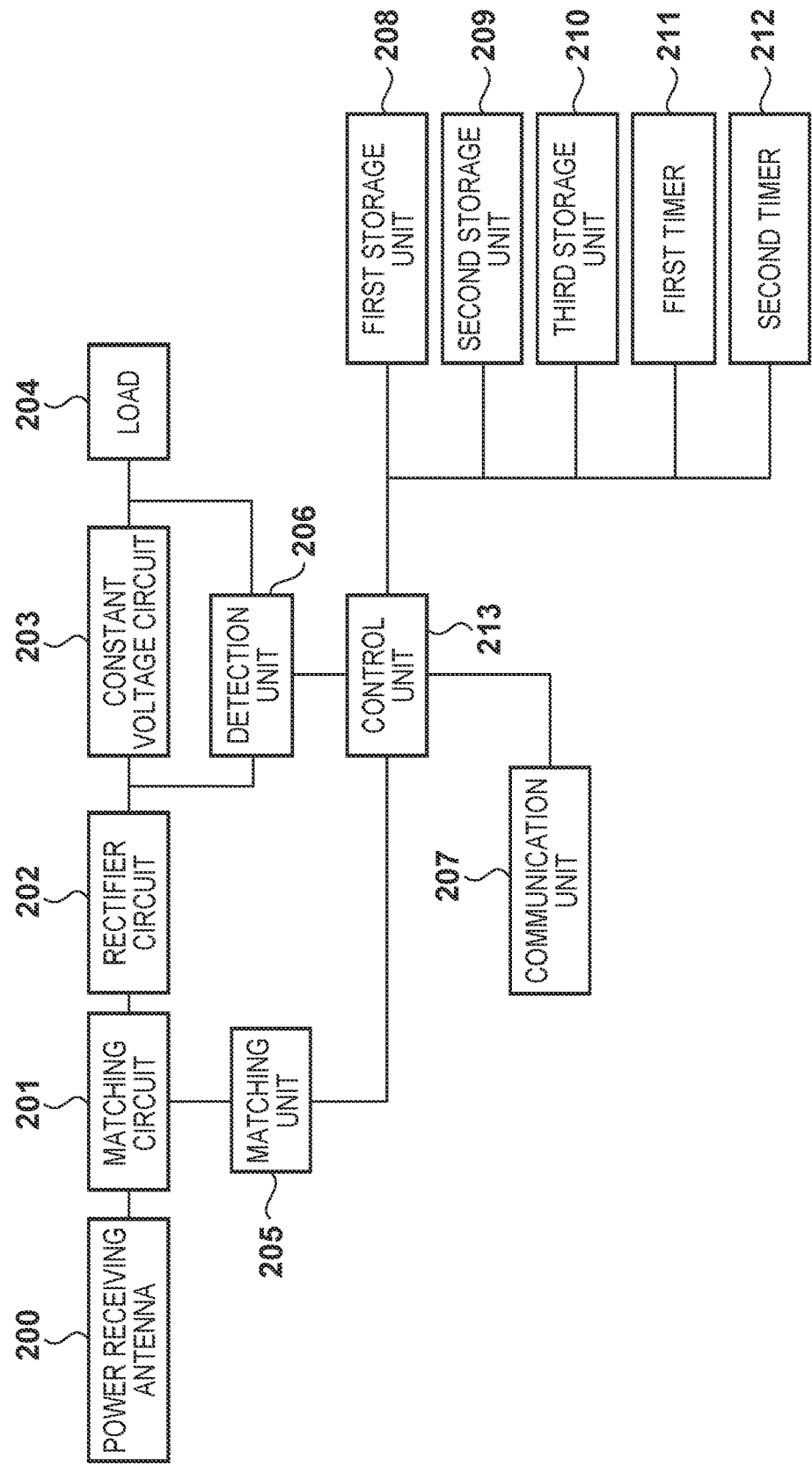
FIG. 2 is a block diagram illustrating an example of the configuration of a power receiving apparatus according to a first embodiment.

FIG. 2 is a block diagram illustrating an example of the configuration of the power receiving apparatus according to the present embodiment. 200 indicates a power receiving antenna. 201 indicates a matching circuit that has a function for matching an impedance of the power receiving antenna with a load 204-side impedance as viewed from a rectifier circuit 202 (called a "load impedance" hereinafter). The matching circuit is configured of an element such as a capacitor, and the power receiving apparatus has a plurality of such matching circuits, which have the capability of adjusting the impedance by switching in accordance with the load impedance, an input voltage, and so on. For example, in the present embodiment, it is assumed that the matching circuits have ten sets that are combinations of elements, and an appropriate set can be set from among the ten sets in accordance with the load impedance.

203 indicates a constant voltage circuit that converts a DC voltage output from the rectifier circuit to a DC voltage level at which the load 204 operates and supplies that DC voltage to the load 204. In the present embodiment, it is assumed that the constant voltage circuit 203 supplies a DC voltage of 5 volts to the load 204. 205 indicates a matching unit. The matching unit 205 has a function for adjusting the impedance of the power receiving antenna to, for example, match the load impedance by selecting, through a process that will be described later, a single set from the combination of ten sets as mentioned above. 206 indicates a detection unit that detects a voltage input into the constant voltage circuit 203, which is a voltage between the rectifier circuit and the constant voltage circuit 203. The detection unit 206 also has a function for detecting a voltage value and a current value between the constant voltage circuit 203 and the load 204 (these will be called an "output voltage" and an "output current", respectively, hereinafter).

207 indicates a communication unit that performs at least one of sending and receiving a control signal regarding power transfer to a communication unit (not shown) of the power transmitting apparatus. In the present embodiment, the communication unit 207 is compliant with the Bluetooth® standard version 4.0 (called "BT 4.0" hereinafter). 208 indicates a first storage unit that stores a predetermined value regarding the input voltage detected by the detection unit 206. 209 indicates a second storage unit that stores a plurality of load impedances and IDs of the matching circuits that are optimal for those load impedances. 210 indicates a third storage unit that stores an operating state of the power receiving apparatus. 211 indicates a first timer that prescribes a time interval at which the power receiving apparatus notifies the power transmitting apparatus of the received power currently being received by the power receiving apparatus. 212 indicates a second timer that prescribes a time interval at which the matching unit 205 selects a set of the matching elements held by the matching circuit. Note that a timeout value of the second timer is set to, for example, a lower value than a timeout value of the first timer. 213 indicates a control unit that controls the power receiving apparatus as a whole.

FIG. 7 is a diagram schematically illustrating information stored in the first storage unit 208. The first storage unit 208 stores a voltage range for the input voltage at which the constant voltage circuit 203 operates stably, or in other words, stores a predetermined threshold value. Note that the numerical values in FIG. 7 are in volts. In FIG. 7, 700 indicates a first threshold value that serves as an upper limit value of the input voltage at which the constant voltage circuit 203 operates stably. Furthermore, 701 indicates a second threshold value that serves as a lower limit value of the input voltage at which the constant voltage circuit 203 operates stably. As shown in FIG. 7, the constant voltage circuit 203 can stably output the aforementioned output voltage (5 volts) as long as the input voltage is between 30 and 5 volts.

FIG. 8 is a diagram schematically illustrating information stored in the second storage unit 209 of a first power receiving apparatus. The second storage unit 209 stores a load impedance corresponding to an amount of power consumed by the load 204 and an optimal matching circuit ID. In the present embodiment, it is assumed that the maximum amount of power consumed by the first power receiving apparatus 101 is 10 watts. Accordingly, a set including a load impedance and an optimal matching circuit ID is stored in the second storage unit 209 for a case where the amount of power consumed is no more than 10 watts.

In FIG. 8, 800 indicates received powers, and in the present embodiment, indicates amounts of power consumed by the load 204. 801 indicates load impedance ranges, whereas 802 indicates matching circuit IDs associated with respective load impedance ranges. Here, identification information regarding the optimal sets of matching circuits is stored as the matching circuit ID for each of a plurality of load impedance ranges.

Next, information stored in the second storage unit 209 as indicated in FIG. 8 will be described for a specific example in which the received power is no less than 9 watts but is less than 10 watts. In the case where the received power is 9 watts, the output voltage is 5 volts, and thus the load impedance is 2.8 ohms, obtained by squaring 5 volts and dividing by 9 watts. Likewise, in the case where the received power is 10 watts, the load impedance is 2.5 ohms, obtained by squaring 5 volts and dividing by 10 watts. Accordingly, in the case where the load impedance is greater than 2.5 ohms and no greater than 2.8 ohms, the matching circuit ID through which impedance matching can be achieved is 1. At this time, impedance matching is achieved between the power receiving antenna and the rectifier circuit, and there is no voltage and power reflection, and thus highly-efficient power transfer is possible. Meanwhile, although the input voltage will change in the case where the impedance matching is not achieved due to the difference between the impedance of the power receiving antenna and the load impedance, it is assumed in the present embodiment that the input voltage is lower the lower the load impedance is. That is, reducing the load impedance makes it possible to reduce the input voltage.

FIG. 9 is a diagram schematically illustrating information stored in the third storage unit 210. In FIG. 9, 900 indicates matching circuit IDs, where identifiers of matching circuits that are to be set are stored. In the present embodiment, it is assumed that an operating mode of the matching unit 205 is determined based on a result of comparing the input voltage with a power threshold value stored in the first storage unit

208. Here, for example, a first operating mode is a mode for executing highly-efficient power transfer through impedance matching, whereas a second operating mode is a mode in which an excessive input voltage is prevented from being applied to the constant voltage circuit 203 by reducing the input voltage. It should be noted that because reducing the input voltage is the purpose of the second operating mode, impedance matching is not of paramount concern, and thus such matching is not achieved.

In the third storage unit 210, a value of "0" for the operating mode indicates the first operating mode, whereas a value of "1" indicates the second operating mode. 902 indicates a next operating mode, and this value is derived as a result of comparing the input voltage with the power threshold value stored in the first storage unit 208. 901 indicates a current operating mode, which is determined, for example, based on a result of comparing the input voltage from the previous cycle with the power threshold value stored in the first storage unit 208. 903 indicates the load impedance. FIG. 9 indicates information stored sequentially in the third storage unit 210 of the first power receiving apparatus as processing advances. In other words, in a state 904, the next operating mode is the first operating mode, and as a result of impedance matching performed in the first operating mode, the matching circuit ID has been changed from 4 to 5 as indicated in a state 905. Likewise, the state transits to a state 906 after operating in a state 905, and transits to a state 907 after the state 906. Although the present embodiment describes past states as being stored in the third storage unit 210 for the sake of simplicity, it is not necessary to store past states, and such states may be overwritten and updated.

In the present embodiment, it is assumed that in an initial state, the power received by the first power receiving apparatus is 6.5 watts. The third storage unit 210 stores this initial state (904). According to the information (904) stored in the third storage unit 210, the load impedance is 3.8 ohms, obtained by squaring the output voltage of 5 volts and dividing by the received power of 6.5 watts. Referring to the second storage unit 209, the matching circuit ID suited to a load impedance of 3.8 ohms is "4", and thus the matching circuit ID in the information (904) stored in the third storage unit 210 is also "4". This indicates that a matching circuit ID of "4" should be set when the load impedance is 3.8 ohms.

Configuration of Power Transmitting Apparatus

Figure 12:
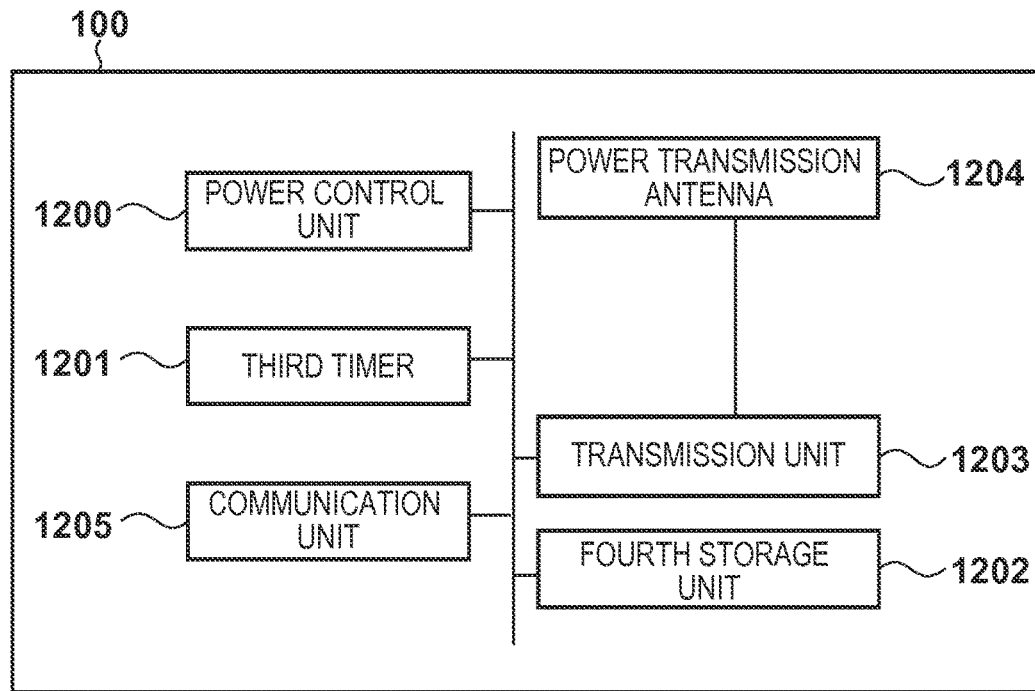
FIG. 12 is a block diagram illustrating an example of the configuration of the power transmitting apparatus according to the first embodiment.

FIG. 12 is a block diagram illustrating an example of the configuration of the power transmitting apparatus according to the present embodiment. In FIG. 12, 1200 indicates a power control unit that controls power transmitted, via a power transmission antenna 1204, by a power transmission unit 1203, which is configured of a class E amp. 1201 indicates a third timer in which is set the same timeout value as that set in the first timer of the power receiving apparatus. 1202 indicates a fourth storage unit that stores a power received by the power receiving apparatus and a power transmitted by the power transmission unit 1203. 1205 indicates a communication unit that, like the communication unit 207 of the power receiving apparatus, is compliant with BT 4.0.

FIG. 15 is a diagram schematically illustrating information stored in the fourth storage unit 1202 of the power transmitting apparatus. 1500 indicates a total power transmitted by the power transmission unit 1203, 1501 indicates a power received by the first power receiving apparatus, and 1502 indicates a power received by the second power receiving apparatus. In a state 1503, the first power receiving apparatus receives a power of 6.5 watts, whereas the second power receiving apparatus receives a power of 13.5 watts. The total transmitted power is the sum thereof, which is 20 watts. Although the transmitted power is a value calculated based on the actual efficiencies of the received power and the transmitted power, the efficiencies of the rectifier circuits in the power receiving apparatuses, the efficiency of the transfer between the power transmission antenna and the power receiving antenna, and so on, it is assumed here that the efficiencies are 100% for the sake of simplicity.

Figure 13:
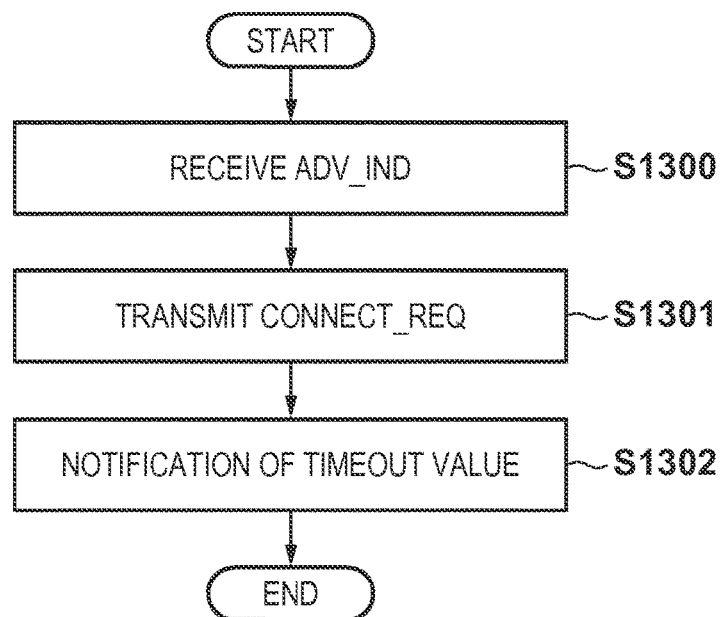
FIG. 13 is a flowchart illustrating processing performed by a communication unit of the power transmitting apparatus according to the first embodiment.

FIG. 13 is a flowchart illustrating processing performed by the communication unit 1205 of the power transmitting apparatus according to the present embodiment. First, the communication unit 1205 of the power transmitting apparatus receives, from the power receiving apparatus, an ADV_IND packet, which is one type of advertising packet defined in the BT 4.0 standard (S1300). The ADV_IND packet includes information such as address information of BT 4.0-compliant devices, services supported by upper-layer applications, and so on.

In response to the reception of the ADV_IND packet, the power transmitting apparatus transmits, to the power receiving apparatus, a CONNECT_REQ packet for establishing a wireless connection with the power receiving apparatus (S1301). At this point in time, the power transmitting apparatus 100 and the first power receiving apparatus 101, for example, are capable of communicating using BT 4.0. After S1301, the power transmitting apparatus 100 according to the present embodiment notifies the power receiving apparatus of the timeout value set in the first timer 211 of the power receiving apparatus and the third timer 1201 in the power transmitting apparatus itself (S1302). As a result, the timeout value is shared between the power transmitting apparatus and the power receiving apparatus. Note that the purpose of the process of S1302 is to share the timeout value set in the first timer 211 of the power receiving apparatus and the third timer 1201 of the power transmitting apparatus, and as long as this sharing occurs, the timeout value may be shared through a method aside from the power transmitting apparatus notifying the power receiving apparatus thereof. For example, the power receiving apparatus may notify the power transmitting apparatus of the timeout value, or the timeout value may be stored in storage units of the power transmitting apparatus and the power receiving apparatus in advance.

Operations of System and Power Receiving Apparatus

Figure 3:
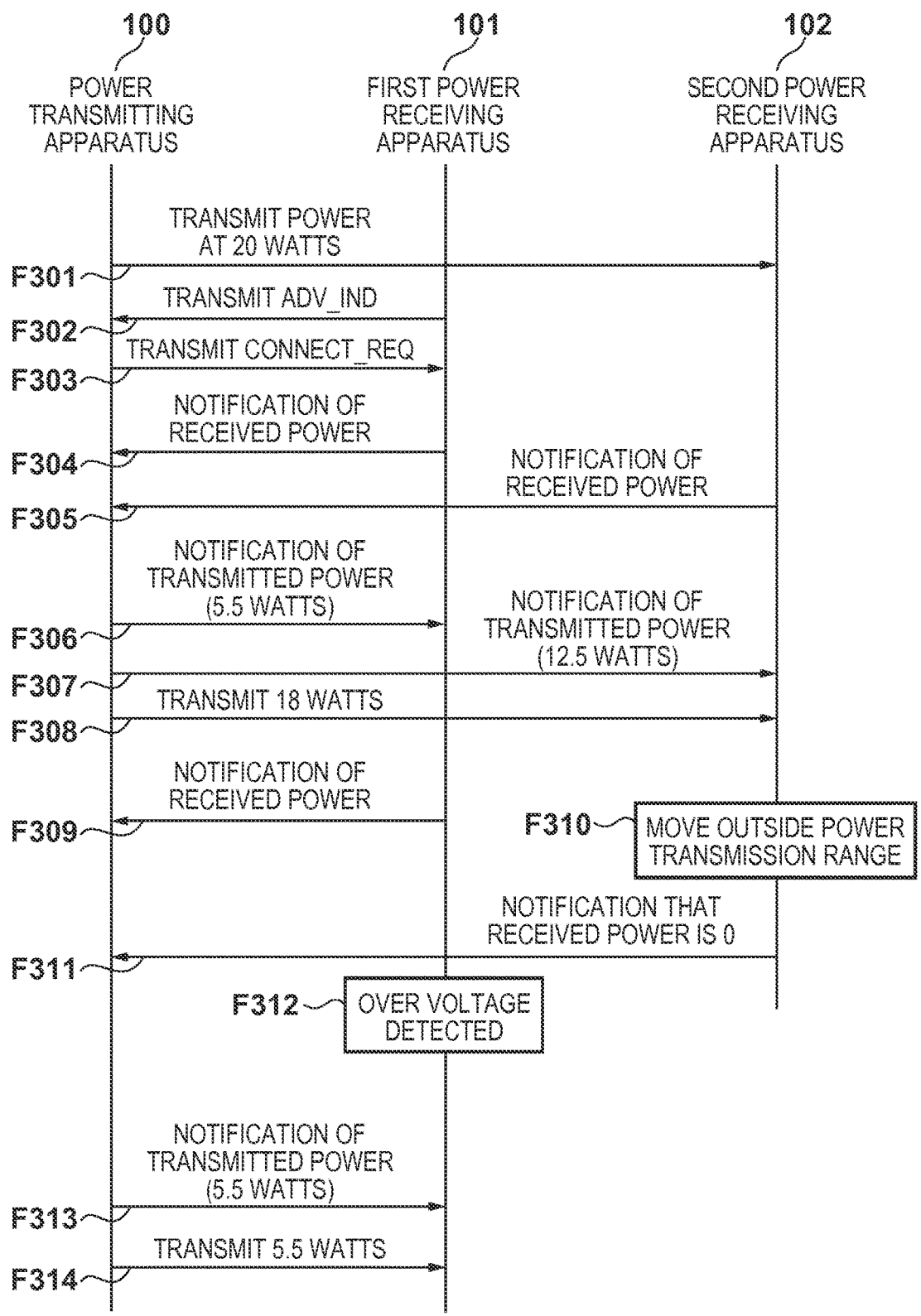
FIG. 3 is a sequence chart illustrating processing executed by a power transmitting apparatus and two power receiving apparatuses according to the first embodiment.
Figure 4:
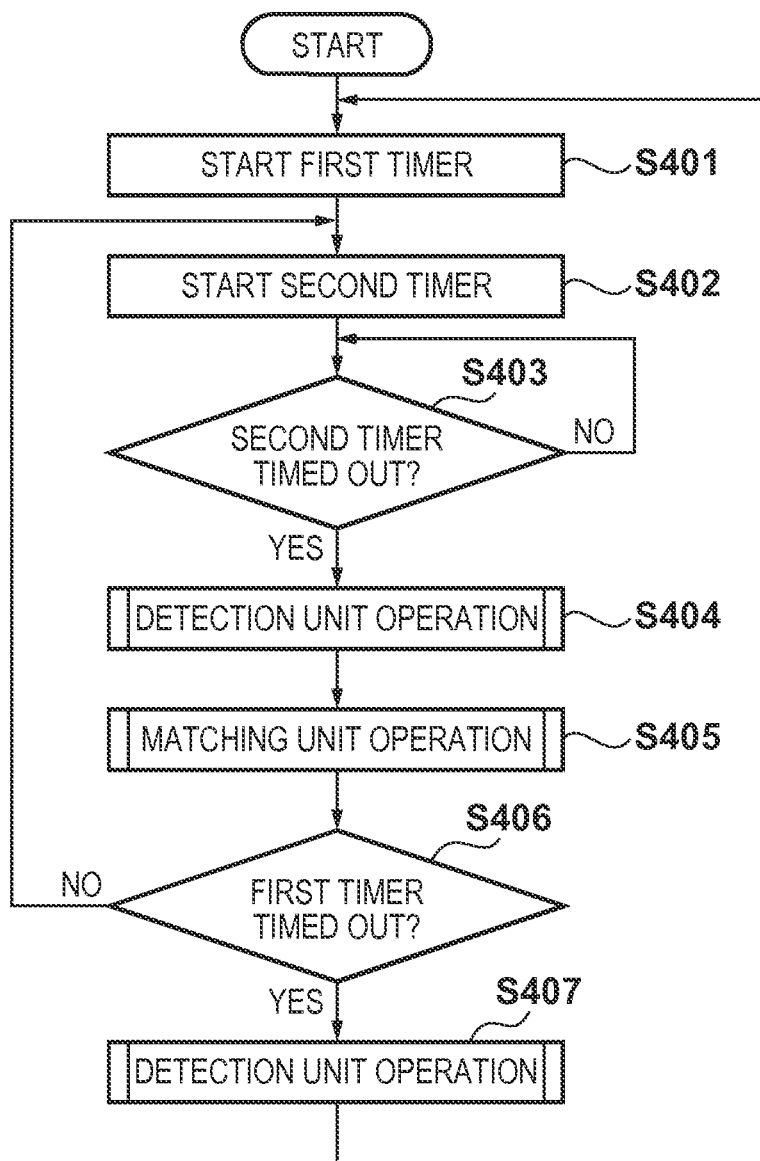
FIG. 4 is a flowchart illustrating processing performed by a control unit of the power receiving apparatus according to the first embodiment.
Figure 5:
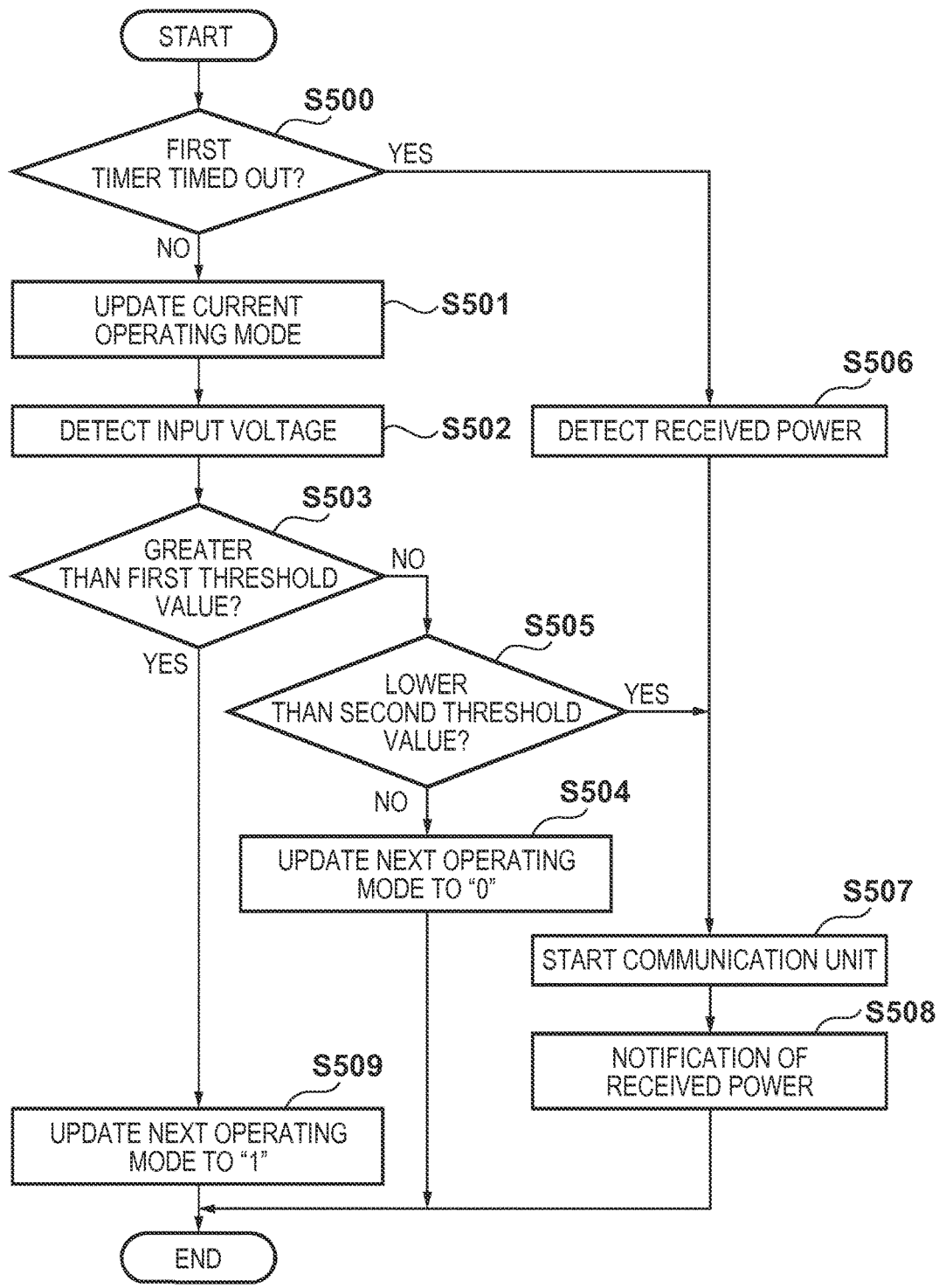
FIG. 5 is a flowchart illustrating processing performed by a detection unit of the power receiving apparatus according to the first embodiment.
Figure 6:
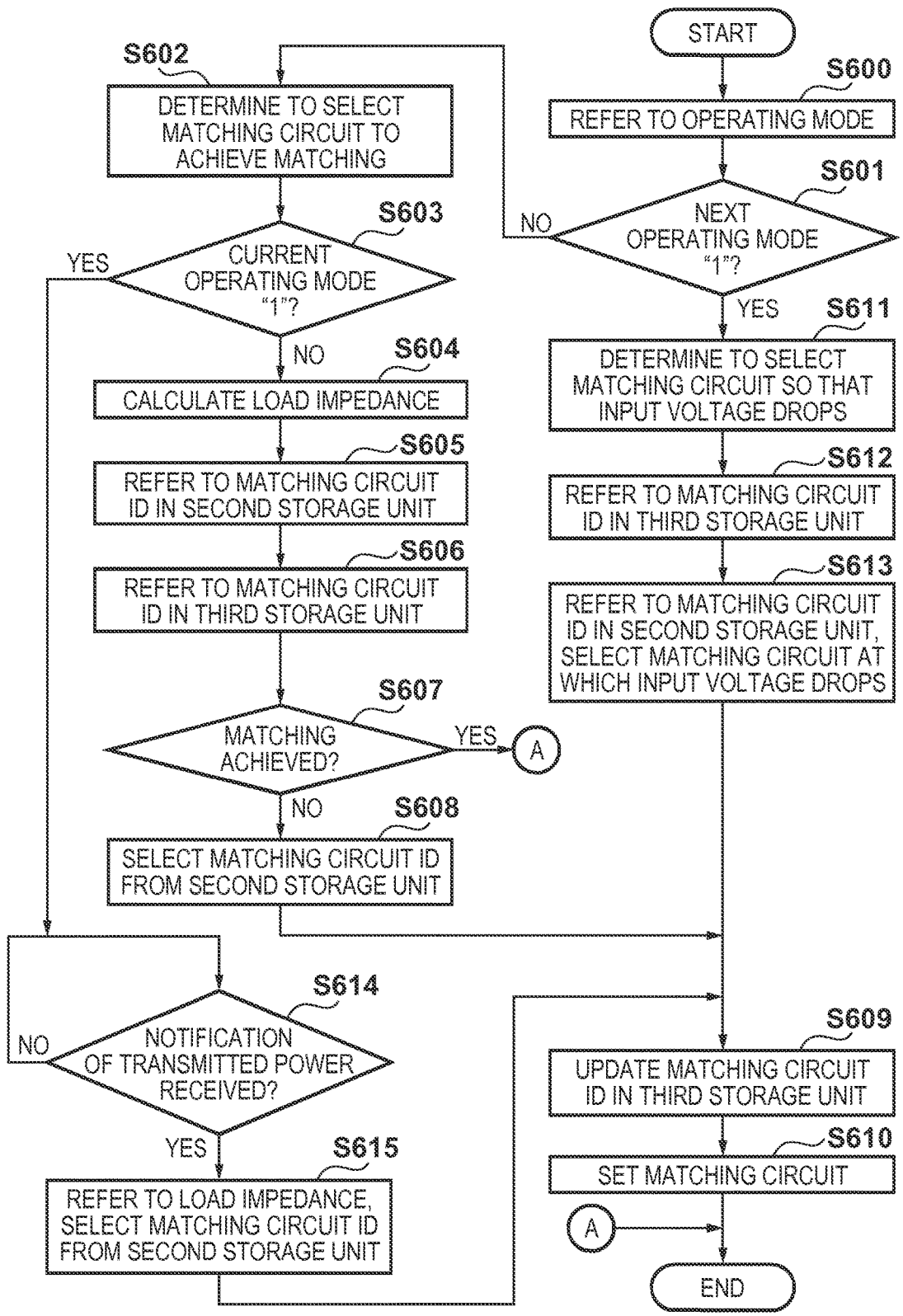
FIG. 6 is a flowchart illustrating processing performed by a matching unit of the power receiving apparatus according to the first embodiment.
Figure 10:
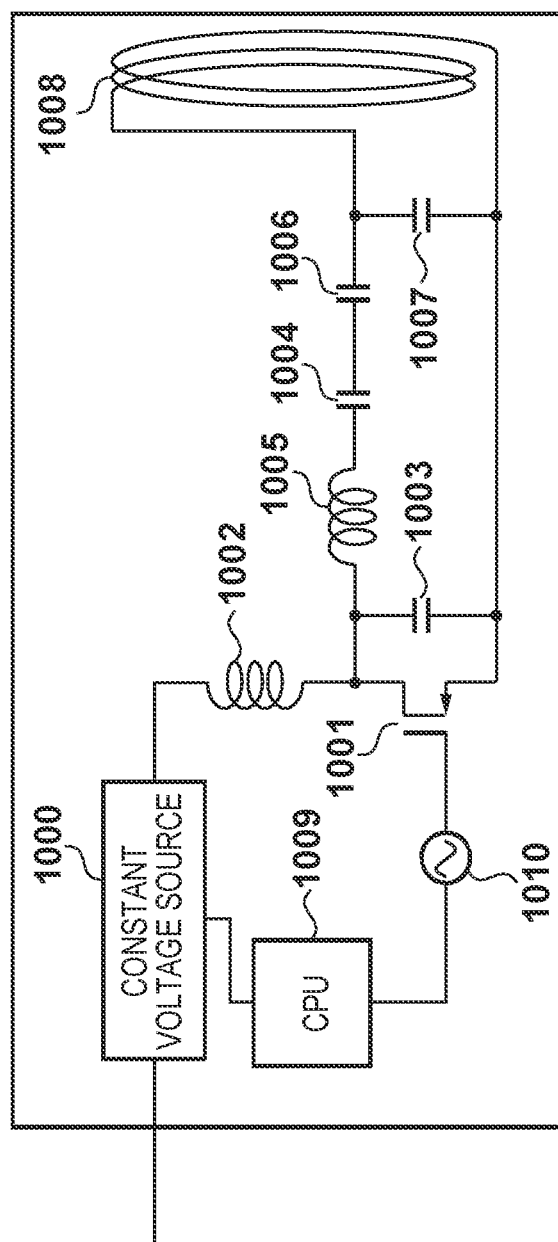
FIG. 10 is a block diagram illustrating an example of the configuration of a conventional power transmitting apparatus.
Figure 11:
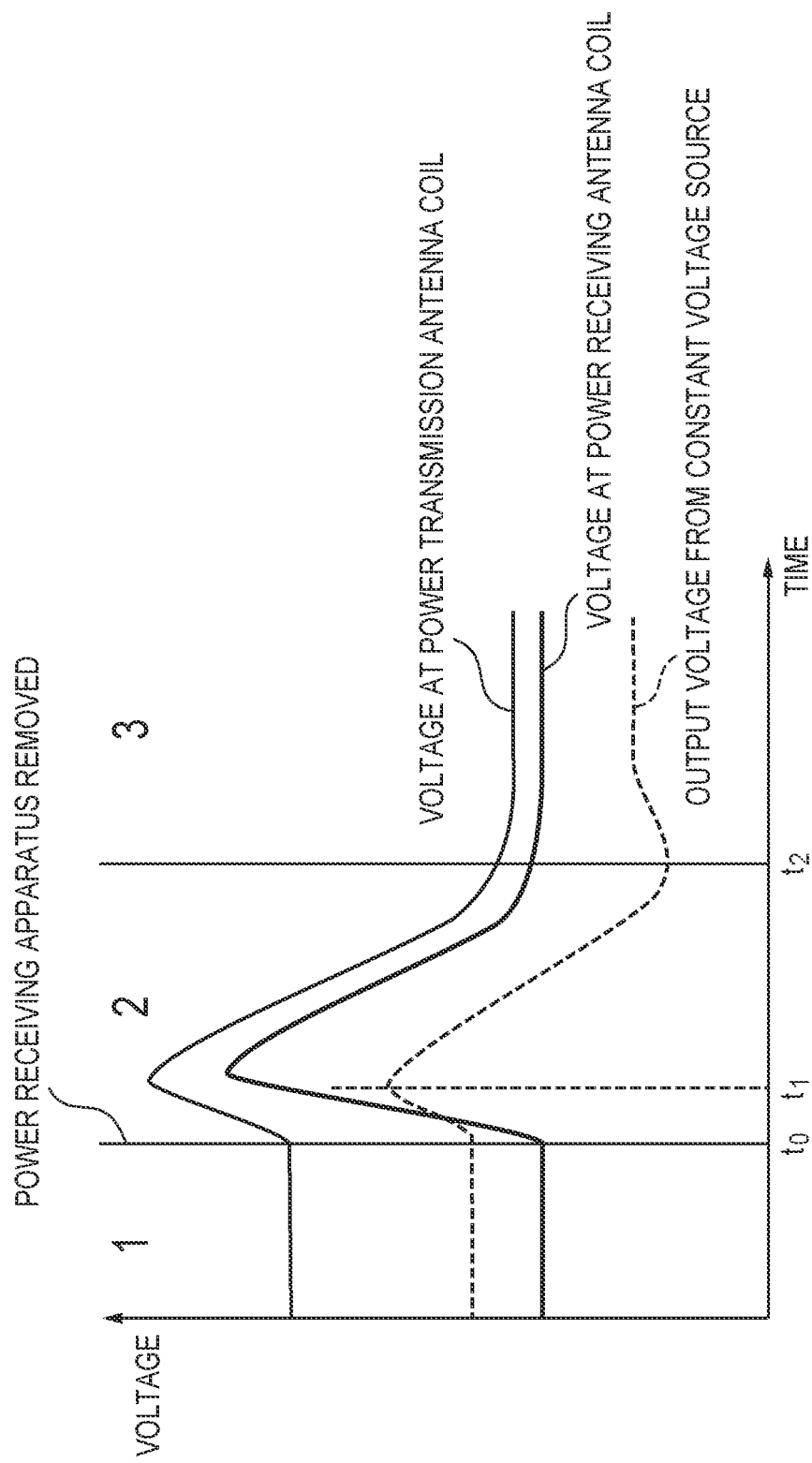
FIG. 11 is a diagram illustrating an example of variations in an AC voltage at a power transmission antenna coil, an output DC voltage from a constant voltage source in the power transmitting apparatus, and an AC voltage at a power receiving antenna coil of a power receiving apparatus that remains, in the conventional wireless power transfer system.

Next, operations performed by the wireless power transfer system will be described using FIGS. 3 through 6 and 14. FIG. 3 is a sequence chart illustrating operations performed by the wireless power transfer system, FIG. 4 is a flowchart illustrating an example of processing performed by the control unit 213 of the power receiving apparatus, FIG. 5 is a flowchart illustrating an example of processing performed by the detection unit 206 of the power receiving apparatus, and FIG. 6 is a flowchart illustrating an example of processing performed by the matching unit 205 of the power receiving apparatus. Meanwhile, FIG. 14 is a flowchart illustrating an example of processing performed by the power control unit 1200 of the power transmitting apparatus.

First, it is assumed that the power received by the first power receiving apparatus is 6.5 watts and the power received by the second power receiving apparatus is 13.5 watts, resulting in a total of 20 watts being transmitted by the power transmitting apparatus (F301). The control unit 213 activates the first timer (S401), and then starts the second timer (S402). When the second timer times out (YES in S402), the control unit 213 causes the detection unit 206 to operate (S404).

Because the timer that timed out in S402 is not the first timer (NO in S500), the detection unit 206 updates the operating mode to the next state from the current state (the initial state; 904 in FIG. 9) (S501). Specifically, because a next operating mode 902 in the current state 904 is "0", a current operating mode 901 in the updated state 905 is set to "0". Then, in order to determine the next operating mode in the updated state 905, the detection unit 206 detects the input voltage input into the constant voltage circuit 203 (S502).

The detection unit 206 then compares the input voltage value detected in S502 with the first threshold value stored in the first storage unit 208. In the case where the load 204 is used in applications where the load experiences comparatively low variations, such as the case where the load 204 is configured of a charging circuit and a chargeable battery, a sudden impedance mismatch normally will not occur. Accordingly, it is assumed here that the input voltage is within the voltage range at which the circuit operates stably (no more than the first threshold value and no less than the second threshold value), stored in the first storage unit 208 (NO in S503 and S505). At this time, the detection unit 206 determines that the constant voltage circuit 203 is operating stably and that the transfer efficiency can be approved by causing the matching unit 205 to operate in the first operating mode and matching the impedances. Accordingly, the detection unit 206 sets the next operating mode 902 in the updated state 905 to "0" (S504), after which the process ends.

Returning to FIG. 4, the control unit 213 then causes the matching unit 205 to operate. The matching unit 205 refers to the operating mode in the information stored in the third storage unit 210 (S600). According to the information 905 stored in the third storage unit 210, the next operating mode is "0" (NO in S601). Accordingly, the matching unit 205 determines that the matching circuit is to be selected in order to match the impedances (S602), and then refers to the current operating mode. According to the information 905 stored in the third storage unit 210, the current operating mode is "0" (NO in S603). Accordingly, the matching unit 205 calculates the load impedance based on the output voltage of the constant voltage circuit 203 and the received power (S604). Here, it is assumed that the received power (the amount of power consumed) has decreased from the aforementioned 6.5 watts to 5.5 watts, due to a change in the state of the load 204 or the like. At this time, the load impedance is 4.5 ohms, obtained by squaring 5 volts and dividing by 5.5 watts. The matching unit 205 then updates the load impedance in the state 905 stored in the third storage unit 210 to "4.5".

The matching unit 205 then refers to the matching circuit IDs in the second storage unit 209 (S605), and searches for the optimal matching circuit ID when the load impedance is 4.5 ohms. According to FIG. 8, it can be seen that the optimal matching circuit ID is "5" in the case where the load impedance is no less than 4.2 ohms but less than 5 ohms. Then, the matching unit 205 refers to the matching circuit IDs in the information 904 stored in the third storage unit 210 in order to determine the current matching circuit ID (S606).

According to the information 904, the matching circuit ID currently set is "4", which differs from the "5" searched out in S605. Accordingly, the matching unit 205 determines, from the relationship between the current load impedance and the current matching circuit ID, that the impedances for power receiving do not match (NO in S607), and selects the optimal matching circuit ID of "5" from the second storage unit 209 (S608). Then, after setting the matching circuit ID to "5" in the updated state 905 in the third storage unit 210 (S609), the matching unit 205 sets the matching circuit (S610), and the process ends.

On the other hand, in S607, in the case where it is determined based on the current load impedance and the current matching circuit ID that the impedances match (YES in S607), it is not necessary to change the matching circuit, and thus the process ends directly. Thus in the first operating mode, the efficiency of the power transfer is increased by the matching unit 205 selecting the matching circuit that enables impedance matching in response to a change in the load impedance caused by a change in the amount of power consumed by the load.

Returning to FIG. 4, when the processing performed by the matching unit 205 ends, the control unit 213 determines that the first timer has timed out (S406). If the first timer has not yet timed out (NO in S406), the processes of the aforementioned S402 to S405 are executed again, and the matching circuit is selected and set.

On the other hand, in the case where the first timer has timed out (YES in S406), the control unit 213 causes the detection unit 206 to operate (S407). In this case, because the first timer has timed out (YES in S500), the detection unit 206 detects the output voltage and the output current of the constant voltage circuit 203, and calculates the received power by multiplying those values (S506). Here, an output voltage of 5 volts and an output current of 1.1 amperes are detected, and thus 5.5 watts is detected as the received power.

Next, the detection unit 206 activates the communication unit 207 (S507). Then, after a wireless connection has been established with a communication unit (not shown) of the power transmitting apparatus 100, the detection unit 206 notifies the power transmitting apparatus 100 of the detected received power (S508). At this time, the first power receiving apparatus 101 transmits the aforementioned ADV_IND packet to the power transmitting apparatus 100 (F302). The power transmitting apparatus 100 transmits a CONNECT_REQ packet in response to the ADV_IND packet in order to establish the wireless connection with the first power receiving apparatus. At this point in time, the communication unit (not shown) of the power transmitting apparatus 100 and the communication unit 207 of the first power receiving apparatus 101 are wirelessly connected through BT 4.0, and are thus capable of communicating using BT 4.0.

After the wireless connection has been established, the first power receiving apparatus 101 notifies the power transmitting apparatus 100 of information including a value of 5.5 watts as the received power detected in S506 (F304, S508), after which the process ends. Likewise, the second power receiving apparatus 102 establishes a wireless connection with the power transmitting apparatus 100, and notifies the power transmitting apparatus 100 of information indicating the received power (F305). It is assumed that the second power receiving apparatus 102 communicates a value of 12.5 watts as the received power at this time.

When the third timer times out (YES in S1400) and the information of the received power is received in F304 and F305, the power transmitting apparatus 100 updates the information of the received powers for the respective power receiving apparatuses in the fourth storage unit based on the received information (S1401). Specifically, in a state 1504, the power transmitting apparatus 100 updates the power received by the first power receiving apparatus 101 to 5.5 watts as notified in F304 and updates the power received by the second power receiving apparatus 102 as notified in F305 to 12.5 watts. Thereafter, the power transmitting apparatus 100 stores 18 watts, obtained by adding the received power amount of 5.5 watts for the first power receiving apparatus 101 to the received power amount of 12.5 watts for the second power receiving apparatus 102, as the updated total transmitted power in the state 1504 (S1402).

The power transmitting apparatus then adjusts the transmitted power (S1402), and notifies the power receiving apparatuses 101 and 102 of information indicating that transmitted power (S1403). Specifically, the first power receiving apparatus 101 is notified that 5.5 watts will be transmitted (F306), and the second power receiving apparatus 102 is notified that 12.5 watts will be transmitted (F307). As a result, the power transmitting apparatus 100 adjusts the transmitted power from 20 watts, which is the amount of power transmitted up until that point, to 18 watts, which is the total of the transmitted power values notified here, and then transmits the adjusted power to the first power receiving apparatus 101 and the second power receiving apparatus 102 (F308, S1404). The power transmitting apparatus 100 can periodically adjust the transmitted power based on the received power as a result of the plurality of power receiving apparatuses performing a process for connecting to the power transmitting apparatus 100 and notifying the power transmitting apparatus 100 of the received power each time the first timer times out in this manner. Doing so makes it possible to achieve balance between the transmitted power and the received power; power that returns to the power transmitting apparatus 100 due to an imbalance is eliminated, which in turn makes it possible to improve the efficiency of power transmission throughout the overall system. Furthermore, by setting the timeout value of the second timer to a lower value than the timeout value of the first timer, the impedances can be matched before the power receiving apparatus notifies the power transmitting apparatus of the received power. Furthermore, as a result of the impedance matching, the power transmitting apparatus 100 can control the transmitted power without a drop in efficiency caused by reflection in the power receiving apparatuses, which in turn makes it possible for the power transmitting apparatus 100 to transmit an appropriate amount of power.

Then, at F309, the communication unit 207 of the first power receiving apparatus 101 notifies the power transmission apparatus 100 of the received power in the same manner as in F304. The received power at this time is the same 5.5 watts as in F305. Meanwhile, it is assumed here that the second power receiving apparatus 102 has moved outside of the power transmission range of the power transmitting apparatus 100, as indicated in FIG. 1B (F310). At this time, the detection unit 206 of the second power receiving apparatus 102 detects that the voltage input into the constant voltage circuit 203 has dropped below the second threshold value due to this movement (YES in S505), and detects that the constant voltage circuit 203 is no longer capable of operating stably. Accordingly, the second power receiving apparatus 102 notifies the power transmitting apparatus 100 that the received power is 0 (F311).

The notification in F311 may be any type of notification as long as it is information that notifies the power transmitting apparatus 100 that power need not be transmitted to the second power receiving apparatus 102 thereafter. For example, the notification may be a notification that the second power receiving apparatus 102 will no longer receive power, a notification indicating a request to stop the transmission of power to the second power receiving apparatus 102, a notification that the second power receiving apparatus 102 cannot operate stably, or the like.

Due to the movement, the impedance is no longer matched between the first power receiving apparatus 101 and the power transmitting apparatus 100, and thus the voltage input to the first power receiving apparatus 101 changes greatly. Accordingly, the detection unit 206 of the first power receiving apparatus 101 detects that the voltage input to the constant voltage circuit 203 has risen above the first threshold value (YES in S503). In other words, at this point in time, the first power receiving apparatus 101 detects that overvoltage, at which the constant voltage circuit 203 cannot operate stably, has been applied (F312). In this case, the first power receiving apparatus 101 determines that it is necessary to cause the matching circuit to operate in the second operating mode and lower the voltage input into the constant voltage circuit 203. Accordingly, the detection unit 206 sets the next operating mode in the updated state 906 to "1" (S509), after which the process ends.

Because the next operating mode is "1" (YES in S601), the matching unit 205 determines that a matching circuit is to be selected in order to lower the input voltage (S611). The matching unit 205 then refers to the matching circuit IDs in the third storage unit 210 (S612). Here, based on the current state 905, the matching circuit ID at this point in time is "5". Accordingly, the matching unit 205 selects a matching circuit at which the input voltage will be lower than when the matching circuit ID is "5". As described earlier, in the present embodiment, the lower the load impedance is (that is, the lower the matching circuit ID is), the lower the input voltage will be.

Accordingly, the matching unit 205 refers to the matching circuit IDs in the second storage unit 209 and selects the matching circuit at which the input voltage will be lower (S613). Specifically, the matching unit 205 selects, for example, the matching circuit ID "1", in which the input voltage will be lower than with the current matching circuit ID of "5". Then, after setting the matching circuit ID to "1" in the updated state 906 in the third storage unit 210 (S609), the matching unit 205 sets the matching circuit and adjusts the impedance (S610), after which the process ends.

The power transmitting apparatus 100 updates the information stored in the fourth storage unit as indicated in a state 1505 and adjusts the transmitted power based on the information received in F309 and F311. Then, the power transmitting apparatus 100 notifies the first power receiving apparatus 101 that 5.5 watts will be transmitted (F314), but does not notify the second power receiving apparatus 102 of the transmitted power. Note that the power transmitting apparatus 100 may issue a notification that power will not be transmitted in response to receiving a notification from the second power receiving apparatus 102 that the received power is 0. Then, the power transmitting apparatus 100 starts transmitting 5.5 watts of power, which is the total transmitted power notified as described above (F315). Here, in the case where the communication unit of the power receiving apparatus is operating under the power transmitted from the power transmitting apparatus, and in particular under the power output by the constant voltage circuit, the operation of the constant voltage circuit will become unstable when the second power receiving apparatus 102 moves outside of the power-transmittable range at F310. As a result, the second power receiving apparatus 102 will become unable to make the notification at F311. Even in such a case, if there is no notification from the second power receiving apparatus 102 at F311, at the point in time when the third timer times out, the power transmitting apparatus 100 determines that the second power receiving apparatus 102 has been removed, and updates the power received by the second power receiving apparatus 102 in the state 1505 to "0". By sharing the timeout value between the power transmitting apparatus and the power receiving apparatus in this manner, the transmission of power can be controlled properly even in the case where the communication unit of the power receiving apparatus operates under the power transmitted by the power transmitting apparatus. Note that as a result, the power transmitting apparatus lowers the transmitted power from 18 watts to 5.5 watts at the time of F314.

Meanwhile, at this point in time, in the first power receiving apparatus 101, the operating mode of the matching unit 205 changes from the first operating mode to the second operating mode, and the input voltage drops. At this time, the matching circuit whose matching circuit ID is "1" is set, and the power transmitted by the power transmitting apparatus 100 has also dropped, and thus the detection unit 206 of the first power receiving apparatus 101 detects that the voltage input to the constant voltage circuit 203 has dropped below the first threshold value (NO in S503). Accordingly, the detection unit 206 sets the next operating mode in the updated state 907 to "0" (S504).

Here, the current operating mode is set to "1" in the updated state 907 by the detection unit 206 (S501). Accordingly, the matching unit 205 operates based on the current operating mode (NO in S601; YES in S603), and stands by to operate until receiving a transmitted power notification from the power transmitting apparatus (S604). This is because in the case where the operating mode returns to the first operating mode despite the power transmitted by the power transmitting apparatus 100 not having dropped, overvoltage may be detected again. It is necessary for the power receiving apparatus to return to the first operating mode from the second operating mode upon confirming that the power transmitting apparatus 100 has lowered the transmitted power and overvoltage is not detected.

Upon receiving a notification from the power transmitting apparatus 100 that the transmitted power will be lowered to 5.5 watts (YES in S604), the matching unit 205 returns operating mode to the first operating mode in F314. Then, the matching unit 205 refers to the load impedances in the third storage unit 210, and selects optimal matching circuit ID from the second storage unit 209 (S615). Specifically, the matching unit 205 refers to the state 907, and selects the matching circuit ID of "5", which is optimal for a load impedance of 4.5 ohms. Then, after updating the matching circuit ID to "5" in the state 907 (S609), the matching unit 205 sets the matching circuit and adjusts the impedance (S610), after which the process ends. In this manner, the matching unit 205 returns the operating mode to the first operating mode.

Although the matching unit 205 returns the operating mode to the first operating mode after the notification in F314 here, it should be noted that this is performed so that overvoltage is not detected again. Accordingly, another method that makes it possible to detect that overvoltage has not occurred again may be used instead. For example, the matching unit 205 may detect that the transmitted power has actually dropped as a result of the detection unit 206 detecting a drop in the voltage input to the constant voltage circuit 203, and may return the operating mode to the first operating mode after that drop has occurred.

As described thus far, the power receiving apparatus can reduce the risk that the constant voltage circuit will be damaged by overvoltage being continuously applied thereto by operating in the second operating mode in the case where a result of the detection unit 206 detecting the input voltage is greater than a first threshold value. In addition, a state in which the constant voltage circuit 203 can operate stably can be maintained by transiting to the second operating mode and adjusting the voltage input into the constant voltage circuit 203. Through this, the first power receiving apparatus 101 can supply a stable voltage to a load, and the load can continue to operate, even in the case where the impedance has changed suddenly, such as when the second power receiving apparatus 102 has been removed.

Furthermore, the power receiving apparatus can prevent a state of overvoltage from recurring by returning the operating mode to the first operating mode only after confirming that overvoltage will not be applied after operating in the second operating mode. As a result, a stable voltage can be continuously supplied to the load. In addition, the power transmitting apparatus can periodically change the transmitted power based on the received power as a result of the power receiving apparatus performing a process for connecting to the power transmitting apparatus and communicating the received power each time the first timer times out. As a result, the transmitted power and the received power can be balanced, and the efficiency of power transfer can be improved throughout the system as a whole. Furthermore, setting the timeout value of the second timer to a lower value than the timeout value of the first timer makes it possible for the power transmitting apparatus to control the transmitted power without a drop in efficiency caused by reflection in the power receiving apparatus. Accordingly, the power transmitting apparatus can control the transmitted power in a state of high efficiency and with little loss.

Furthermore, the power receiving apparatus has the second operating mode, which serves as a measure against overvoltage, and thus it is no longer necessary to take overvoltage into consideration on the power transmitting apparatus side. Accordingly, as shown in FIG. 15, the transmitted power may be controlled based only on the received powers, which makes it possible to simplify the processing performed by the power transmitting apparatus.

In addition to the configurations described above, the same effects can be achieved by the individual configurations described hereinafter, or by combinations thereof.

Although the foregoing describes the load impedance as being calculated from the output voltage and the received power, the load impedance may be calculated from the output voltage and the output current.

In addition, although the foregoing describes the advertising packets as the ADV_IND packet and the CONNECT_REQ packet, these packets may be other types of advertising packets defined in BT 4.0. Furthermore, although the communication units are described as being compliant with BT 4.0, the communication units may be compliant with another communication standard. This communication standard may be, for example, another BT standard, wireless LAN, Zigbee®, NFC, or the like.

Furthermore, in the above descriptions, the matching unit 205 compares the matching circuit ID in the third storage unit 210 with the matching circuit ID in the second storage unit 209 and selects the matching circuit to be set, during the second operating mode. However, instead, a dedicated matching circuit for the second operating mode may be provided in advance, and this matching circuit provided in advance may be selected upon transiting to the second operating mode without carrying out a comparison. Specifically, a matching circuit may be provided for the case where, for example, the received power exceeds 10 watts (the load impedance is lower than 2.5 ohms), with a matching circuit ID of "0" in the second storage unit 209. Through this, even in the case where, for example, a matching circuit whose matching circuit ID is "1" is set, a matching circuit "0" can be selected in order to lower the received voltage.

In addition, although the foregoing describes the matching unit 205 as selecting the matching circuit ID of "1", in order to achieve the lowest received voltage, when the current matching circuit ID is "5" in S613, a different matching circuit ID may be selected.

For example, the matching unit 205 may select a matching circuit ID that is lower than "5", or in other words, "4" or less, and may perform adjustment by selecting matching circuits in steps until the voltage input into the constant voltage circuit 203 no longer exceeds the first threshold value. For example, the matching unit 205 may select the matching circuit ID of "4" in S613, after which the detection unit 206 determines in S503 that the voltage input to the constant voltage circuit 203 is greater than the first threshold value. Then, the matching unit 205 may perform S613 again and select the matching circuit ID of "3", after which the detection unit 206 determines in S503 whether the voltage input to the constant voltage circuit 203 exceeds the first threshold value. Repeating this process makes it possible to identify the matching circuit ID at which the voltage input into the constant voltage circuit 203 will be no greater than the first threshold value.

As another example, the matching unit 205 selects the matching circuit ID of "2" in S613. Then, the detection unit 206 determines in S503 that the voltage input to the constant voltage circuit 203 does not exceed the first threshold value. In this case, the matching unit 205 performs S613 again and selects the matching circuit ID of "3". Then, the detection unit 206 determines in S503 whether the voltage input to the constant voltage circuit 203 exceeds the first threshold value. The selection of the matching circuit ID is repeated until the voltage input into the constant voltage circuit 203 exceeds the first threshold value. Through this, the matching unit 205 can select, for example, the matching circuit ID of "2", at which the voltage input into the constant voltage circuit 203 does not exceed the first threshold value.

Through this, impedance mismatching can be suppressed to the greatest extent possible while also lowering the received voltage, and thus a drop in the efficiency of the power transfer in the system can be suppressed to the greatest extent possible while also preventing overvoltage from being applied.

In addition, although the communication units according to the present embodiment are compliant with BT 4.0, another communication standard may be used instead. The same effects can be achieved even when using a wireless LAN, NFC, or the like, for example.

Second Embodiment

System and Apparatus Configuration

Figure 16:
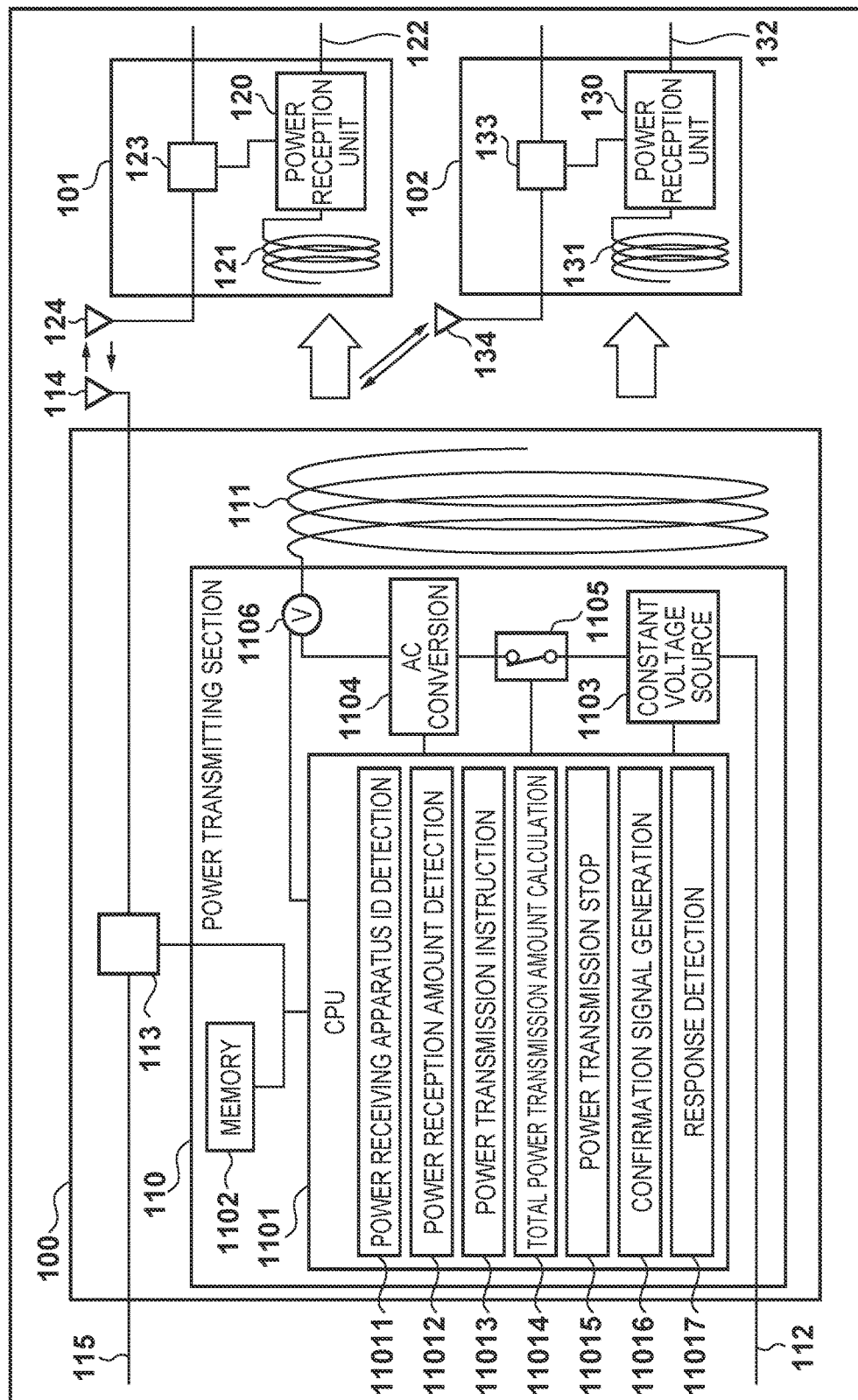
FIG. 16 is a block diagram illustrating an example of the configuration of a power transmitting apparatus according to a second embodiment.

FIG. 16 is a block diagram illustrating an example of the configuration of a wireless power transfer system, and the power transmitting apparatus 100 in particular, according to the present embodiment. The power transmitting apparatus 100 and the power receiving apparatuses 101 and 102 include communication units 113, 123, and 133, respectively, each having communication functions compliant with the Bluetooth (registered trademark) 4.0 standard, for example. The power transmitting apparatus 100 and the power receiving apparatuses 101 and 102 communicate wirelessly with each other by transmitting and receiving electromagnetic waves to and from an antenna 114 and an antenna 124 or 134, respectively.

In the power transmitting apparatus 100, 110 indicates a power transmission section that converts DC or AC power input from a power transmission line 112 into AC-frequency power in a transmission band, and transmits the power to at least one of the first power receiving apparatus 101 and the second power receiving apparatus 102, for example, via a power transmission antenna coil 111. 120 in the first power receiving apparatus 101 and 130 in the second power receiving apparatus 102 indicate power reception units that convert AC power received via power receiving antenna coils 121 and 131, respectively, into DC or AC power in a desired frequency, and output the power to power transmission lines 122 and 132, respectively.

Power is transmitted over a long distance particularly when transmitting power using a resonance phenomenon, microwaves, or the like, and thus it is necessary to pair power transmitting apparatuses with power receiving apparatuses and transmit power to a desired apparatus while preventing power from being transmitted to other apparatuses and objects. Accordingly, the power receiving apparatuses 101 and 102 that are to receive power search out a power transmitting apparatus that is capable of transmitting power via the communication units 123 and 133, and carry out pairing with the communication unit 113 of a power transmitting apparatus that has been found (that is, the power transmitting apparatus 100). For example, identification information (IDs) for identifying the power receiving apparatuses are exchanged between the communication unit 113 of the power transmitting apparatus 100 and the communication unit 123 of the first power receiving apparatus 101 and between the communication unit 113 of the power transmitting apparatus 100 and the communication unit 133 of the second power receiving apparatus 102.

In the power transmission section 110, 1103 indicates a constant voltage source, and the power to be transmitted is adjusted by a CPU 1101 in accordance with the power required for power reception. 1105 indicates a power transmission amount limiting unit, which is configured of, for example, a current limiting circuit, a voltage limiting circuit, an ON/OFF circuit that uses a switching element, or the like. The power transmission amount limiting unit 1105 is controlled to cut the supply of power from the constant voltage source 1103 to an AC conversion unit 1104 or reduce the transmitted power when overvoltage is detected, in order to protect the circuitry of the power receiving apparatuses. In the present embodiment, it is assumed that, for example, an ON/OFF circuit that uses a switching element is employed as the power transmission amount limiting unit 1105, and thus the following will refer to the power transmission amount limiting unit as a "switch". Note that the transmitted power may be limited by controlling the constant voltage source 1103, for example.

1104 indicates an AC conversion unit, which converts DC power or AC power from an AC outlet or the like into a frequency for power transmission. 1106 indicates an AC voltmeter that detects a voltage at the power transmission antenna coil 111 and the AC conversion unit 1104. 1102 indicates a memory in which is stored the identification information (IDs) of power receiving apparatuses obtained from device authentication carried out through the communication unit 113.

Here, the CPU 1101 functions as at least one of an ID detecting unit 11011, a power reception amount detecting unit 11012, a power transmission instructing unit 11013, a total power transmission amount calculating unit 11014, a power transmission stopping unit 11015, a confirmation signal generating unit 11016, and a response detecting unit 11017, for example.

The ID detecting unit 11011 detects the identification information (IDs) that identify the power receiving apparatuses. When the power transmitting apparatus 100 transmits power to at least one of the power receiving apparatuses, the ID detecting unit 11011 detects information identifying the power receiving apparatus that serves as the power transmission partner, and identifies that power receiving apparatus as a power transmission target. Note that the power receiving apparatus is identified by, for example, acquiring the ID of the power receiving apparatus in an initial authentication carried out during wireless power transfer. Meanwhile, in a state where power transmission is stopped or the transmitted power is suppressed to no more than a predetermined amount of power, which will be described later, the ID of the power receiving apparatus is detected from a power transmission request signal from the power receiving apparatus or from a response to a confirmation signal confirming that the power receiving apparatus is in a power-transmittable range of the power transmitting apparatus in which power can be transmitted from the power transmitting apparatus to the power receiving apparatus.

The power reception amount detecting unit 11012 detects and identifies the power received by at least one of the power receiving apparatuses that serves as a partner apparatus for the wireless power transfer. Through this, the power transmitting apparatus 100 determines how much power should be transmitted, and adjusts the voltage of the constant voltage source 1103. The power transmission instructing unit 11013 outputs an instruction that, for example, turns the switch 1105 on, so that power transmission is started in a state where wireless power transfer is possible, or in other words, in a state where overvoltage is not being applied to the power receiving apparatus.

On the other hand, the power transmission stopping unit 11015 outputs an instruction that, for example, turns the switch 1105 off, so that power transmission is stopped in a state where overvoltage may be applied to the power receiving apparatus. Here, if the power is reduced to, for example, no more than a minimum received power value in each of at least one of the power receiving apparatuses, or to a predetermined amount of power less than the minimum received power value, overvoltage will not be applied to the power receiving apparatus even in a state where it is possible that overvoltage will be applied to the power receiving apparatus. For example, in the case where the power received by a first power receiving apparatus is 5.5 watts (W) and the power received by a second power receiving apparatus is 13.5 W, suppressing the transmitted power to no more than 5.5 W ensures that even if one of the power receiving apparatuses is removed, overvoltage will not be applied to the remaining power receiving apparatus. Accordingly, the power transmission stopping unit 11015 may limit the current or voltage and suppress the transmitted power to no more than a predetermined amount of power instead of turning the switch 1105 off. Furthermore, the transmitted power may be suppressed to no more than a predetermined amount of power by controlling the voltage of the constant voltage source 1103.

The total power transmission amount calculating unit 11014 calculates a total amount of power received by each of at least one of the power receiving apparatuses as a total power transmission amount. The confirmation signal generating unit 11016 and the response detecting unit 11017 provide a trigger for resuming power transmission after the power transmission has been stopped or suppressed to no more than a predetermined amount of power. Specifically, for each power receiving apparatus that has thus far been a power transmission destination, the confirmation signal generating unit 11016 generates a confirmation signal confirming that the power receiving apparatus is in the power-transmittable range and confirming whether to continue the power reception. The generated confirmation signal is transmitted to the power receiving apparatuses present in the power-transmittable range. Thereafter, the response detecting unit 11017 detects whether a response signal has been received from the power receiving apparatus that received the confirmation signal.

Then, for the power receiving apparatus that received the response signal, the total power transmission amount calculating unit 11014, for example, identifies the received power requested by that power receiving apparatus based on information contained in the response signal, for example. Specifically, in the case where, for example, the response signal contains information directly identifying the requested received power, the total power transmission amount calculating unit 11014 identifies the requested received power from that information. Meanwhile, in the case where the response signal contains information instructing the received power to be increased or reduced relative to the power received up until that point, the total power transmission amount calculating unit 11014 may identify the requested received power based on the power received up until that point and the stated information. Thereafter, for example, the total power transmission amount calculating unit 11014 adjusts the transmitted power by controlling the voltage of the constant voltage source 1103 so as to supply the total amount of the received power requested by all of the power receiving apparatuses that are the sources of the response signals. The power transmission instructing unit 11013 then turns the switch 1105 on, and power transmission to the remaining power receiving apparatus is started. Through this, in the case where some of the power receiving apparatuses have been removed and the power transmission is stopped or suppressed, the power transmission can be quickly resumed at the power requested by the remaining power receiving apparatus.

Processing of Power Transmitting Apparatus

Figure 17:
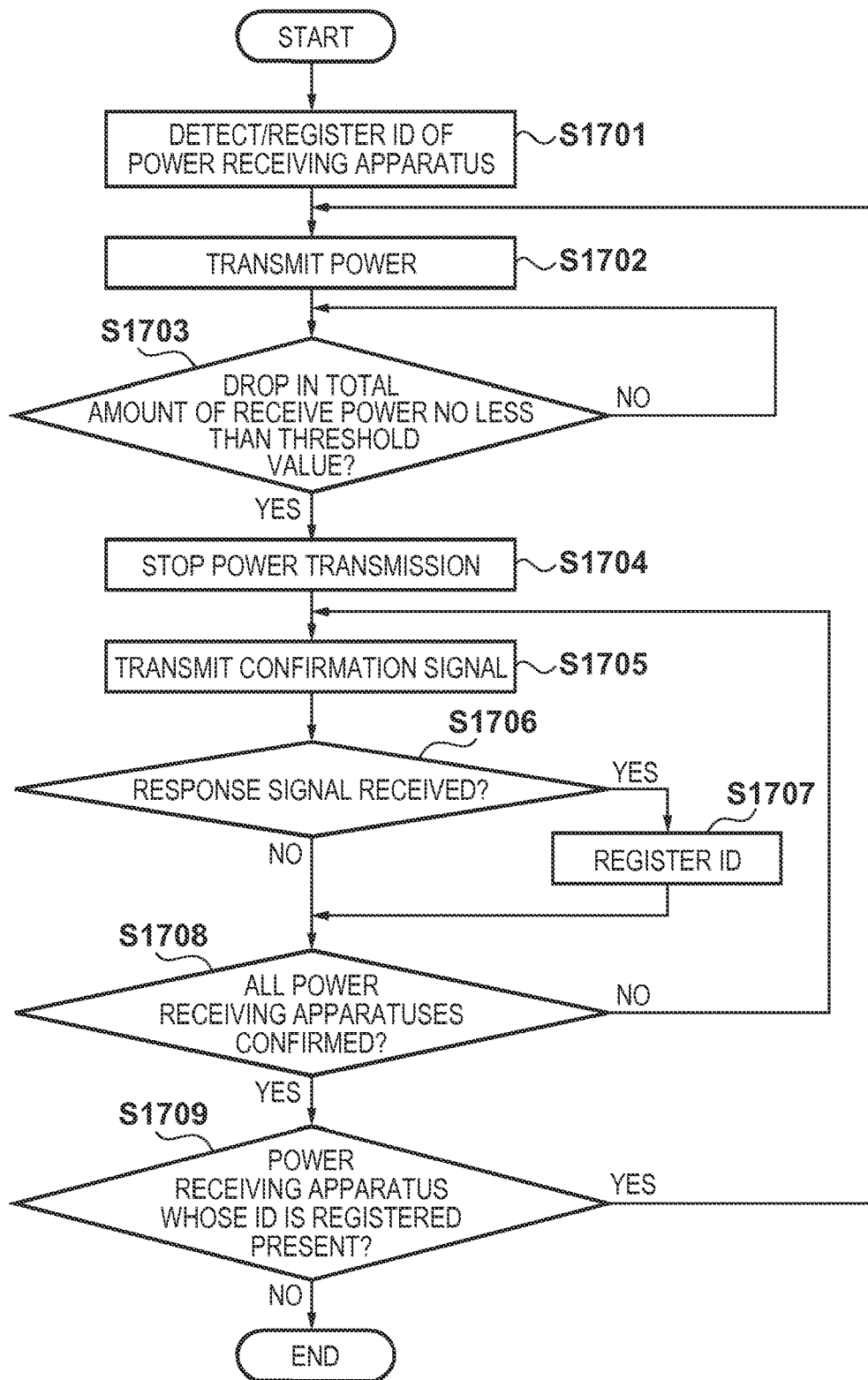
FIG. 17 is a flowchart illustrating an example of processing executed by the power transmitting apparatus according to the second embodiment.

FIG. 17 is a flowchart illustrating an example of processing executed by the power transmitting apparatus 100. In the wireless power transfer system, the power transmitting apparatus starts power transmission after identifying the power transmission partner by confirming the identification information (IDs) of the power receiving apparatuses and so on. Likewise, the power receiving apparatus receives power after identifying the partner from which power is to be received by confirming the identification information of the power transmitting apparatus and so on. The power transmitting apparatus, which is capable of transmitting power to a plurality of power receiving apparatuses, exchanges the identification information with a power receiving apparatus each time a power receiving apparatus is detected within the power-transmittable range, registers the identification information (IDs) of the power receiving apparatuses that are to be power transmission partners (S1701), and then starts power transmission (S1702).

After starting the power transmission, the power transmitting apparatus 100 monitors the total amount of power received by each of at least one power receiving apparatus (S1703). In the case where the total amount of received power has varied, the power transmitting apparatus 100 determines whether the amount of variation is greater than a predetermined amount. Specifically, for example, it is detected that a diminution in the total amount of received power is equal to or greater than a predetermined amount. Then, in the case where the power transmitting apparatus 100 has detected the total amount of received power as varying no less than a predetermined amount (YES in S1703), the power transmission is stopped (S1704).

Figure 19:
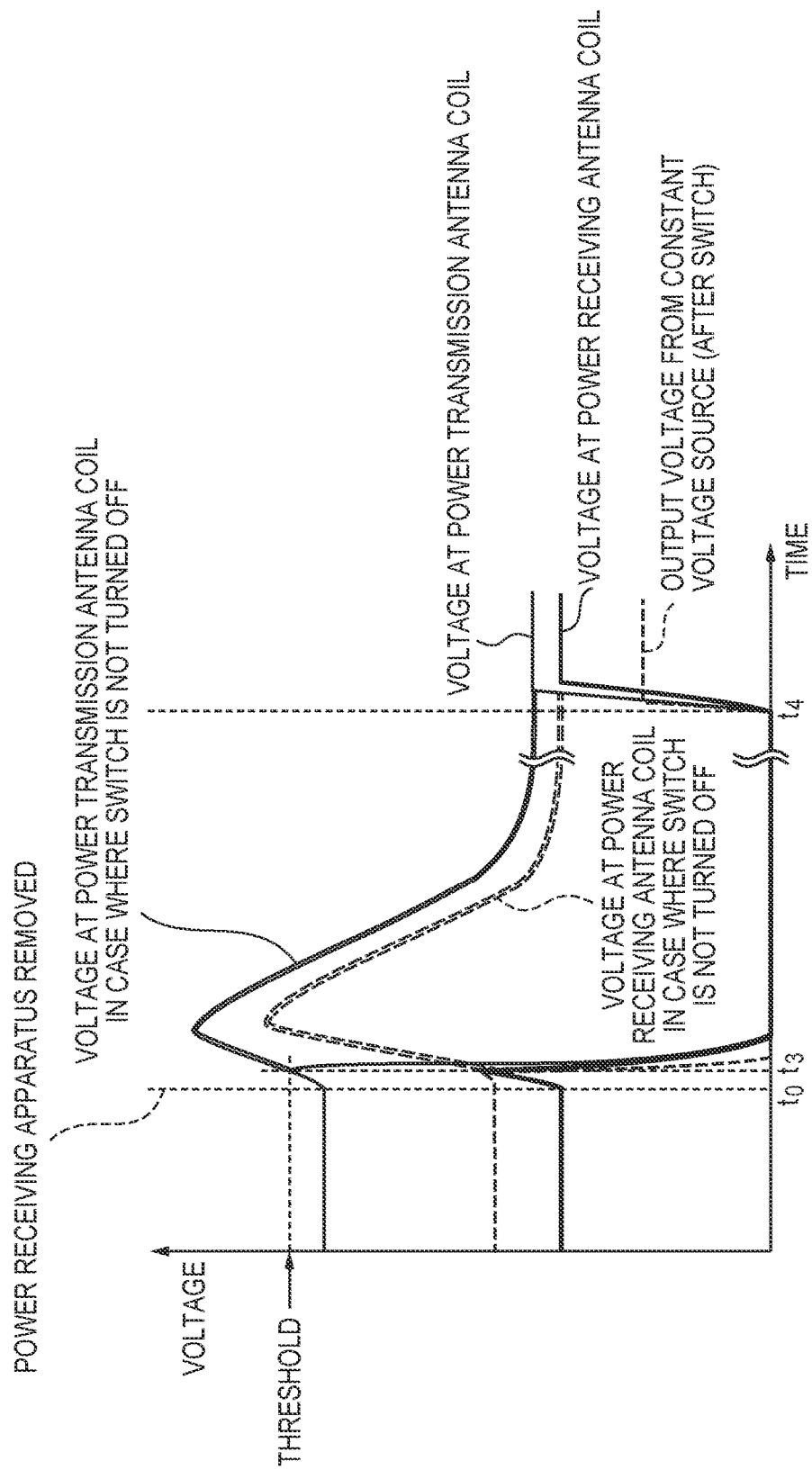
FIG. 19 is a diagram illustrating an example of variations in an AC voltage at a power transmission antenna coil, an output DC voltage from a constant voltage source in the power transmitting apparatus, and an AC voltage at a power receiving antenna coil of a power receiving apparatus that remains, in the wireless power transfer system according to the second embodiment.

FIG. 19 is a graph illustrating an example of variations in the AC voltage at the power transmission antenna coil 111, the output DC voltage from the constant voltage source 1103 in the power transmitting apparatus, and the AC voltage at the power receiving antenna coil 121 of the first power receiving apparatus 101 that remains, according to the present embodiment. In the case where the power has suddenly dropped due to the second power receiving apparatus 102 being removed, the current received by the power receiving apparatus, and the total amount of power received, will drop, and the impedance on the power reception side, as viewed from the power transmission antenna coil, will rise. Accordingly, as shown in FIG. 19, the AC voltage at the power transmission antenna coil 111 of the power transmitting apparatus 100 will temporarily rise. At this time, the AC voltmeter 1106 of the power transmitting apparatus 100 detects the rise in the voltage, and in the case where the amount of the rise is greater than or equal to a threshold value, the CPU 1101 turns the switch 1105 off.

In this manner, the power transmitting apparatus 100 can determine whether the total amount of power received by the power receiving apparatus has dropped no less than a predetermined amount based on the amount of the rise in the voltage, and control for stopping the power transmission can then be executed based on the result of the determination. Likewise, it may be determined whether the total amount of received power has dropped no less than a predetermined amount based on a result of monitoring the manner in which the transmitted power varies. Here, the AC voltage at the power receiving antenna coil 121 of the first power receiving apparatus 101 drops to 0 V when the switch 1105 is turned off. Accordingly, the power reception unit of the first power receiving apparatus 101 can be prevented from being damaged by overvoltage. Note that the power transmitting apparatus 100 may lower the transmitted power to no more than a predetermined voltage rather than stopping the power transmission. The "predetermined voltage" at this time may be, for example, a power no more than the lowest value among the power received by the respective power receiving apparatuses.

After stopping all power transmission using the switch 1105, the power transmitting apparatus 100 transmits, via the communication unit 113, the confirmation signal confirming whether the power receiving apparatus is within the power-transmittable range and whether power reception will be continued, to all of the power receiving apparatuses to which power has been transmitted to up until that point (S1705). The first power receiving apparatus 101 returns the response signal as a response to the confirmation signal to the power transmitting apparatus 100, whereas the second power receiving apparatus 102 that has been removed does not respond. Here, when responding to the confirmation signal, the first power receiving apparatus 101 transmits information indicating the requested received power. In the case where the power transmitting apparatus 100 has received the response signal responding to the confirmation signal (YES in S1706), the power transmitting apparatus 100 registers the ID of the power receiving apparatus that transmitted the response signal (S1707), but does not register IDs for the power receiving apparatus from which the response signal has not been detected (NO in S1706). Then, in the case where, after transmitting the confirmation signal to all of the power receiving apparatuses that have been power transmission destinations up to that point (YES in S1708), there is a power receiving apparatus whose ID is registered (YES in S1709), the power transmitting apparatus 100 controls the constant voltage source 1103 to transmit the total amount of received power requested by the power receiving apparatuses, and resumes the power transmission.

Processing of Power Receiving Apparatus

Figure 18:
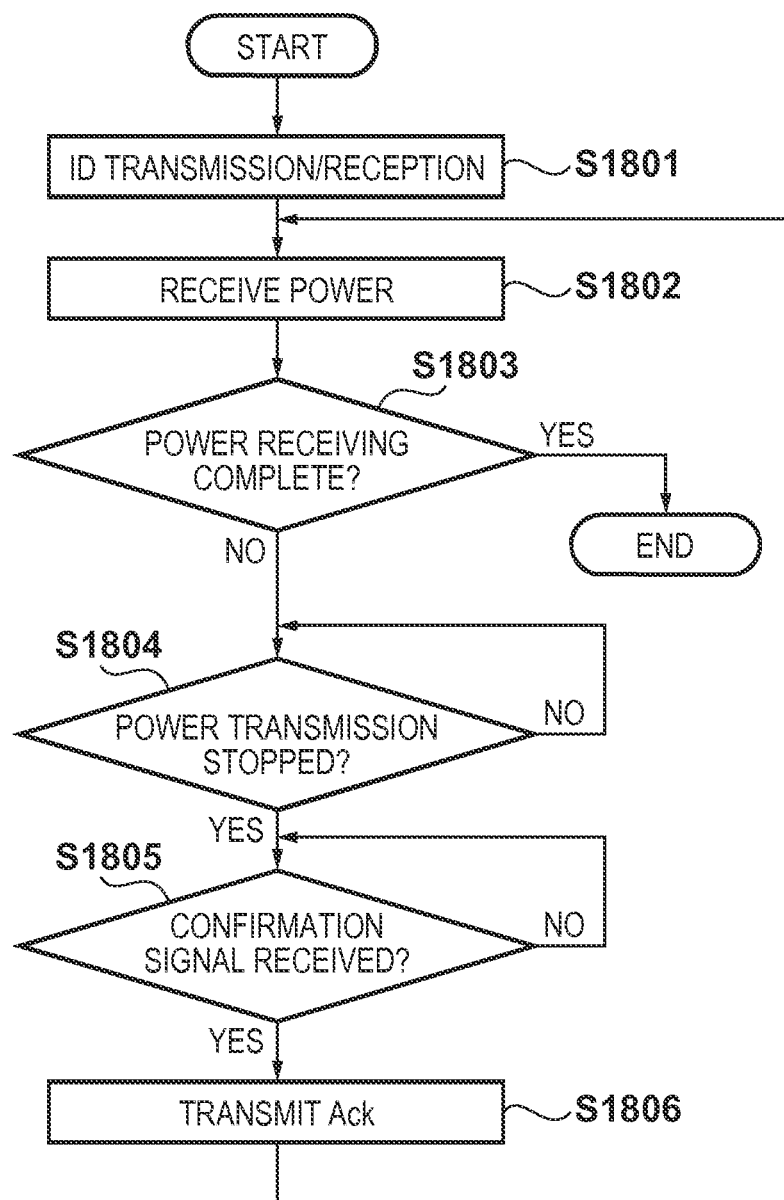
FIG. 18 is a flowchart illustrating an example of processing executed by a power receiving apparatus according to the second embodiment.

FIG. 18 is a flowchart illustrating an example of processing executed by the power receiving apparatus. After executing at least one of transmitting identification information (an ID) and receiving identification information from the power transmitting apparatus (S1801), the power receiving apparatus starts receiving power from the power transmitting apparatus (S1802). Then, in the case where the power reception has ended, such as in the case where charging has been completed (YES in S1803), the power receiving apparatus ends the processing.

On the other hand, in the case where the power reception has not ended (NO in S1803), the power receiving apparatus monitors whether the transmission of power from the power transmitting apparatus 100 has been stopped or whether the transmitted power is being suppressed (S1804). In the case where the power transmission has been stopped (YES in S1804) or the case where the transmitted power has been suppressed, the power receiving apparatus stands by for the confirmation signal to be transmitted from the power transmitting apparatus 100 (S1805). Then, in the case where the power receiving apparatus has received the confirmation signal (YES in S1805), the power receiving apparatus transmits a response signal (Ack) including the requested received power (S1806). Then, when the power transmission from the power transmitting apparatus 100 is resumed, the processing from S1802 on is repeated.

The foregoing has described the power transmitting apparatus identifying the received power requested by the power receiving apparatus based on the response signal when the power transmission is temporarily stopped or suppressed. However, the power transmitting apparatus may, for example, acquire only the identification information of the power receiving apparatus from the response signal and identify, as the requested received power for that power receiving apparatus, an amount of power received up until the power transmission was temporarily stopped or suppressed, that corresponds to the identification information and is stored in the memory 1102 or the like. Furthermore, the power receiving apparatus may include information indicating whether to increase or decrease the received power from the amount of power received up until that point, or indicating an amount of increase or decrease, in the response signal, and the power transmitting apparatus may identify the requested received power based on the amount of power received by the power receiving apparatus up until that point and based on the stated information. Note that in this case, the power receiving apparatus may periodically notify the power transmitting apparatus of the requested received power through the periodic exchange of information or the like.

Furthermore, although the above configuration makes it possible to identify power receiving apparatuses that are present in the power-transmittable range of the power transmitting apparatus and that will continue to receive power by the power transmitting apparatus generating and transmitting the confirmation signal to the power receiving apparatuses and the power receiving apparatuses transmitting response signals in response thereto, the present invention is not limited thereto. For example, the power transmitting apparatus may identify power receiving apparatuses that are present in the power-transmittable range of the power transmitting apparatus and that will continue to receive power by receiving a power transmission request signal from the power receiving apparatuses within a predetermined amount of time after power transmission has been stopped or suppressed to no more than a predetermined power.

Figure 20:
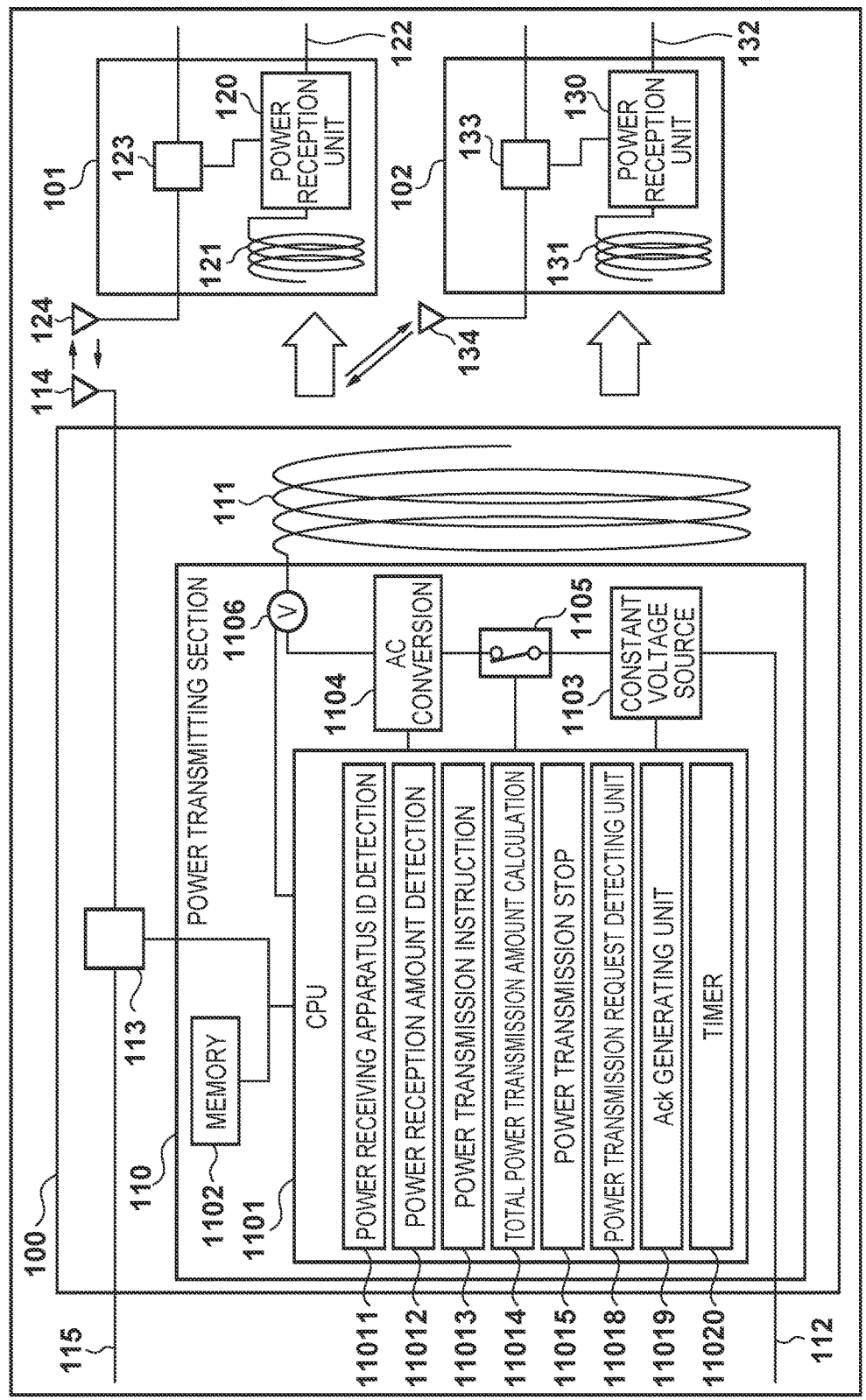
FIG. 20 is a block diagram illustrating another example of the configuration of the power transmitting apparatus according to a second embodiment.

FIG. 20 illustrates an example of the configuration of the wireless power transfer system, and of the power transmitting apparatus in particular, in such a case. As shown in FIG. 20, the power transmitting apparatus 100 in this case includes a power transmission request detecting unit 11018, an Ack generating unit 11019, and a timer 11020 instead of the confirmation signal generating unit 11016 and the response detecting unit 11017. Like the confirmation signal generating unit 11016 and the response detecting unit 11017 shown in FIG. 16, the power transmission request detecting unit 11018, the Ack generating unit 11019, and the timer 11020 serve to provide a trigger for resuming power transmission after the power transmission has been temporarily stopped or the transmitted power has been suppressed.

Specifically, for example, in the case where the power received by the first power receiving apparatus 101 that has not been removed has dropped to zero or has decreased despite not issuing a request to stop the power transmission, the first power receiving apparatus 101 transmits a power transmission request signal to the power transmitting apparatus 100. The power transmission request detecting unit 11018 receives and detects the power transmission request signal. Then, the Ack generating unit 11019 generates a response signal (Ack) in response to the power transmission request signal, and transmits the response signal to the first power receiving apparatus 101, from which the power transmission request signal was transmitted. At this time, the timer 11020 measures a predetermined amount of time, and the power transmission request detecting unit 11018 identifies the power receiving apparatus from which the power transmission request signal has been transmitted within that predetermined amount of time.

Then, for example, based on a result of the detection, the total power transmission amount calculating unit 11014 calculates the total amount of power received by all of the power receiving apparatus from which the power transmission request signal has been transmitted within the predetermined amount of time, and controls the voltage of the constant voltage source 1103. The power transmission instructing unit 11013 then turns the switch 1105 on, and power transmission to the remaining power receiving apparatus is started. Through this, in the case where some of the power receiving apparatuses have been removed and the power transmission is stopped or suppressed, the power transmission can be quickly resumed at the power requested by the remaining power receiving apparatus.

Note that the power receiving apparatus may transmit the requested received power within the power transmission request signal, for example. In this case, for example, the total power transmission amount calculating unit 11014 analyzes the power transmission request signal and calculates the total amount of power received, based on the requested received power from each of the power receiving apparatuses from which the power transmission request signal has been transmitted within the predetermined amount of time. Meanwhile, the power transmitting apparatus may, for example, acquire only the identification information of the power receiving apparatus from the power transmission request signal and identify, as the requested received power for that power receiving apparatus, an amount of power received up until the power transmission was temporarily stopped or suppressed, that corresponds to the identification information and is stored in the memory 1102 or the like. Furthermore, the power receiving apparatus may include information indicating whether to increase or decrease the received power from the amount of power received up until that point, or indicating an amount of increase or decrease, in the power transmission request signal, and the power transmitting apparatus may identify the requested received power based on the amount of power received by the power receiving apparatus up until that point and based on the stated information. Note that in this case, the power receiving apparatus may periodically notify the power transmitting apparatus of the requested received power through the periodic exchange of information or the like.

Figure 21:
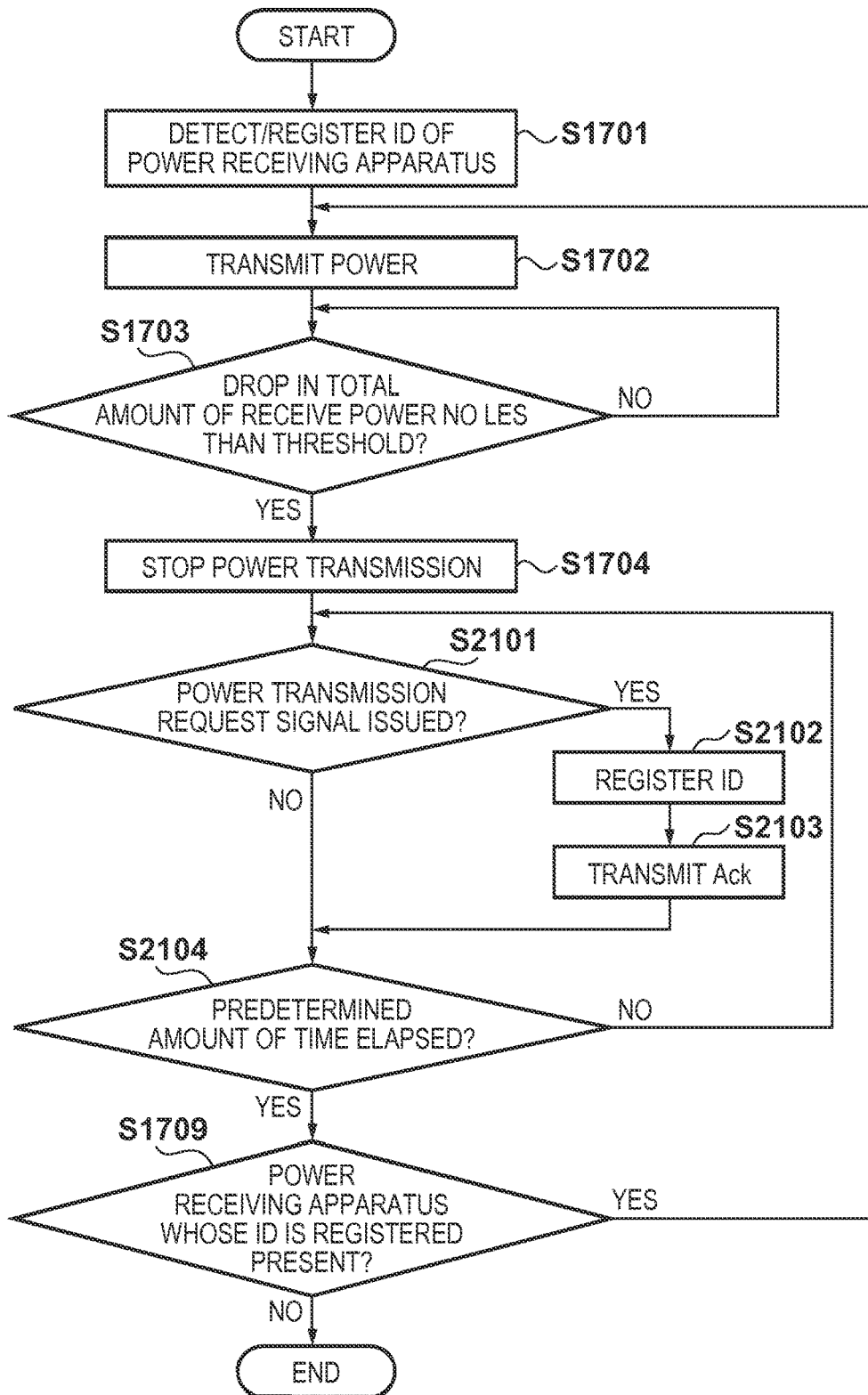
FIG. 21 is a flowchart illustrating another example of processing executed by the power transmitting apparatus according to the second embodiment.
Figure 22:
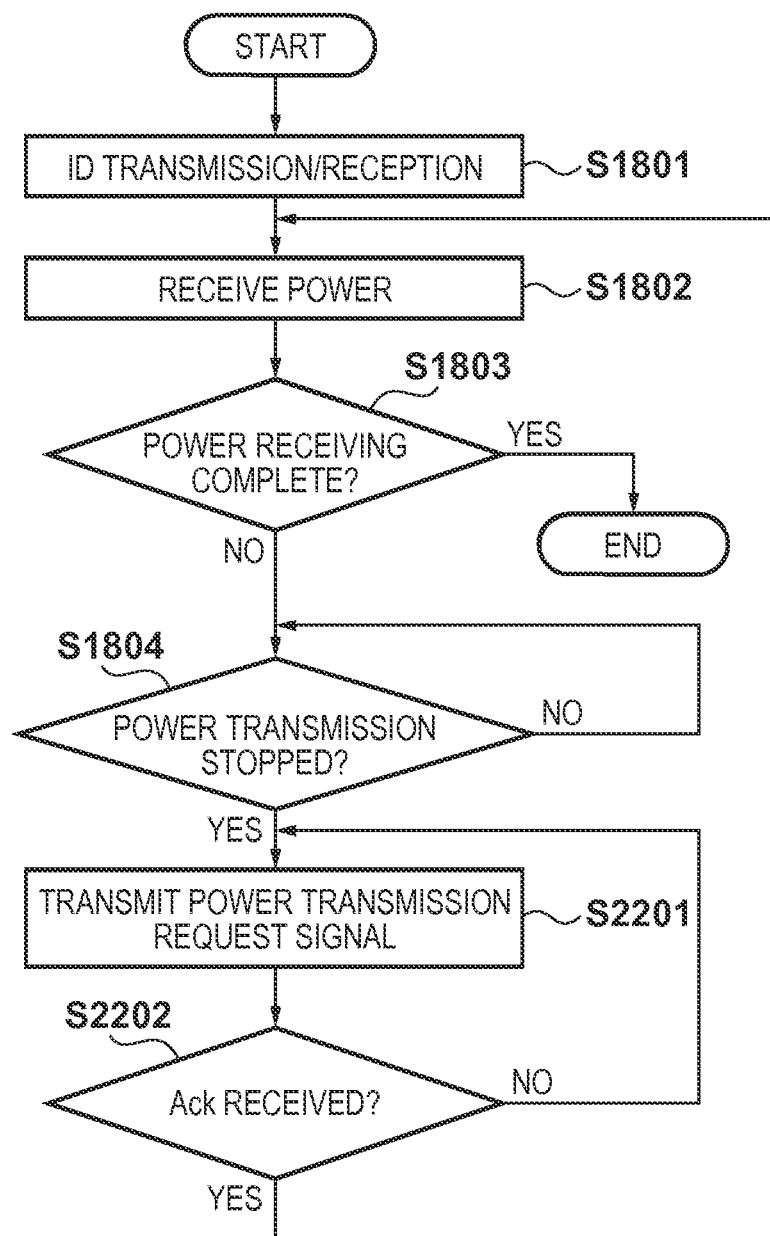
FIG. 22 is a flowchart illustrating another example of processing executed by a power receiving apparatus according to the second embodiment.

FIG. 21 is a flowchart illustrating a flow of processing executed by the power transmitting apparatus at this time. Likewise, FIG. 22 is a flowchart illustrating a flow of processing executed by the power receiving apparatus at this time. In FIGS. 21 and 22, steps that execute the same processes as those in FIG. 17 or 18 are given the same reference numerals, and descriptions thereof will be omitted.

As shown in FIG. 22, upon detecting that power transmission has stopped or the amount of transmitted power has been suppressed (YES in S1804), the power receiving apparatus transmits the power transmission request signal to the power transmitting apparatus (S2201). This power transmission request signal includes, for example, an amount of requested received power. After stopping or suppressing the power transmission, the power transmitting apparatus activates the timer 11020 and stands by for the power transmission request signal (S2101). Then, upon receiving the power transmission request signal within the predetermined amount of time, the power transmitting apparatus registers the ID of the power receiving apparatus from which the power transmission request signal was transmitted (S2102) and transmits an Ack to the power receiving apparatus from which the power transmission request signal was transmitted (S2103). Then, when the predetermined amount of time has elapsed (YES in S2104), the power transmitting apparatus finishes standing by for the power transmission request signal, and in the case where there is a power receiving apparatus whose ID is registered (YES in S1709), the power transmitting apparatus controls the constant voltage source 1103 to transmit the total amount of received power requested by the power receiving apparatuses, and resumes the power transmission. On the other hand, after transmitting the power transmission request signal, the power receiving apparatus stands by for the Ack from the power transmitting apparatus (S2202), and after receiving the Ack, resumes the power reception.

Note that in S2101, the power transmitting apparatus may stand by for only the power transmission request signal from a power receiving apparatus that has already been a power transmission destination. In other words, the power transmitting apparatus may ignore power transmission request signals from power receiving apparatuses that have not yet been power transmission destinations. This makes it possible to prevent a delay in resuming the power transmission caused by registering new power receiving apparatuses. However, in the case where a power transmission request signal has been received from a new power receiving apparatus that has not yet been a power transmission destination, the power transmitting apparatus may register the new power receiving apparatus and start transmitting power to that power receiving apparatus upon resuming the power transmission.

Although the foregoing describes the power transmitting apparatus as acquiring the identification information that identifies power receiving apparatuses that have already been power transmission destinations while the power transmission is stopped or the transmitted power is suppressed and resuming the supply of power to the power receiving apparatuses corresponding to that identification information, the same device authentication as in the initial authentication may be executed once again instead. Through this, the power transmitting apparatus can resume the power transmission having identified the power receiving apparatus with certainty. Furthermore, a simplified authentication that is different from the initial authentication, such as simply confirming the identification information (ID), may be executed when resuming the supply of power. This makes it possible to reduce the amount of processing performed when resuming power transmission, which in turn makes it possible to quickly resume the power transmission.

Furthermore, although the foregoing has described the communication between the power transmitting apparatus and the power receiving apparatuses as employing a separate communication function unrelated to the wireless power transfer, the communication may instead be carried out with power transmission signals used for the wireless power transfer by employing load modulation or the like. Doing so makes it possible to simplify the configurations of the power transmitting apparatus and the power receiving apparatuses.

The present embodiment describes a case where the AC voltmeter 1106, which measures the AC voltage at the power transmission antenna coil 111, is used to detect variations of no less than a predetermined amount in the power received by the power receiving apparatus serving as a power transmission partner. However, in the case where the constant voltage source 1103 includes a detection function for detecting at least one of the output voltage and the output current, that function may be used to detect variations in the voltage, current, impedance, and so on and detect variations of no less than a predetermined amount in the power received by the power receiving apparatus serving as a power transmission partner. Furthermore, the AC conversion unit that includes a class E amp and the like may be provided with at least one of a voltage detection function and a current detection function, and variations of no less than a predetermined amount in the power received by the power receiving apparatus serving as a power transmission partner may be detected using results from those detection functions.

Furthermore, although the present embodiment describes a method for limiting the power transmission amount by using the power transmission amount limiting unit that employs a switching element, it should be noted that because the constant voltage source has a function for adjusting the voltage in accordance with the power received by the power receiving apparatus, the transmitted power may be limited by the constant voltage source using that function. Meanwhile, if the constant voltage source is a switching-mode power supply, the power transmission may be controlled on or off using the switching function thereof. Furthermore, in the case where the constant voltage source has a current control function, the transmitted power may be controlled using that function.

Through the above operations, a state in which overvoltage may be applied is detected by monitoring the degree of variation in the total amount of received power, and the power transmission is temporarily stopped or the amount of power transmitted is suppressed to no more than a predetermined amount of power in accordance with the detection. The received power requested by the power receiving apparatus that will continue to receive power is identified while the power transmission is temporarily stopped or suppressed, and the power transmission is resumed after controlling the transmitted power in accordance with the requested received power that has been identified. As a result, overvoltage will not be applied to the power receiving apparatus, and the chance of the apparatus being damaged can be reduced.

Third Embodiment

The first embodiment describes the power receiving apparatus as having an impedance matching function, and describes a method in which the power transfer efficiency is increased through impedance matching in a first operating mode, whereas overvoltage is prevented from being applied internally in a second operating mode. Meanwhile, the second embodiment describes a method in which the application of overvoltage to the power receiving apparatus is prevented by the power transmitting apparatus stopping power transmission in S1704 of FIG. 17. The present embodiment, however, describes processing executed by the power transmitting apparatus in the case where a power receiving apparatus having a function for operating in the aforementioned second operating mode and a power receiving apparatus that does not have that function are both present.

Figure 23:
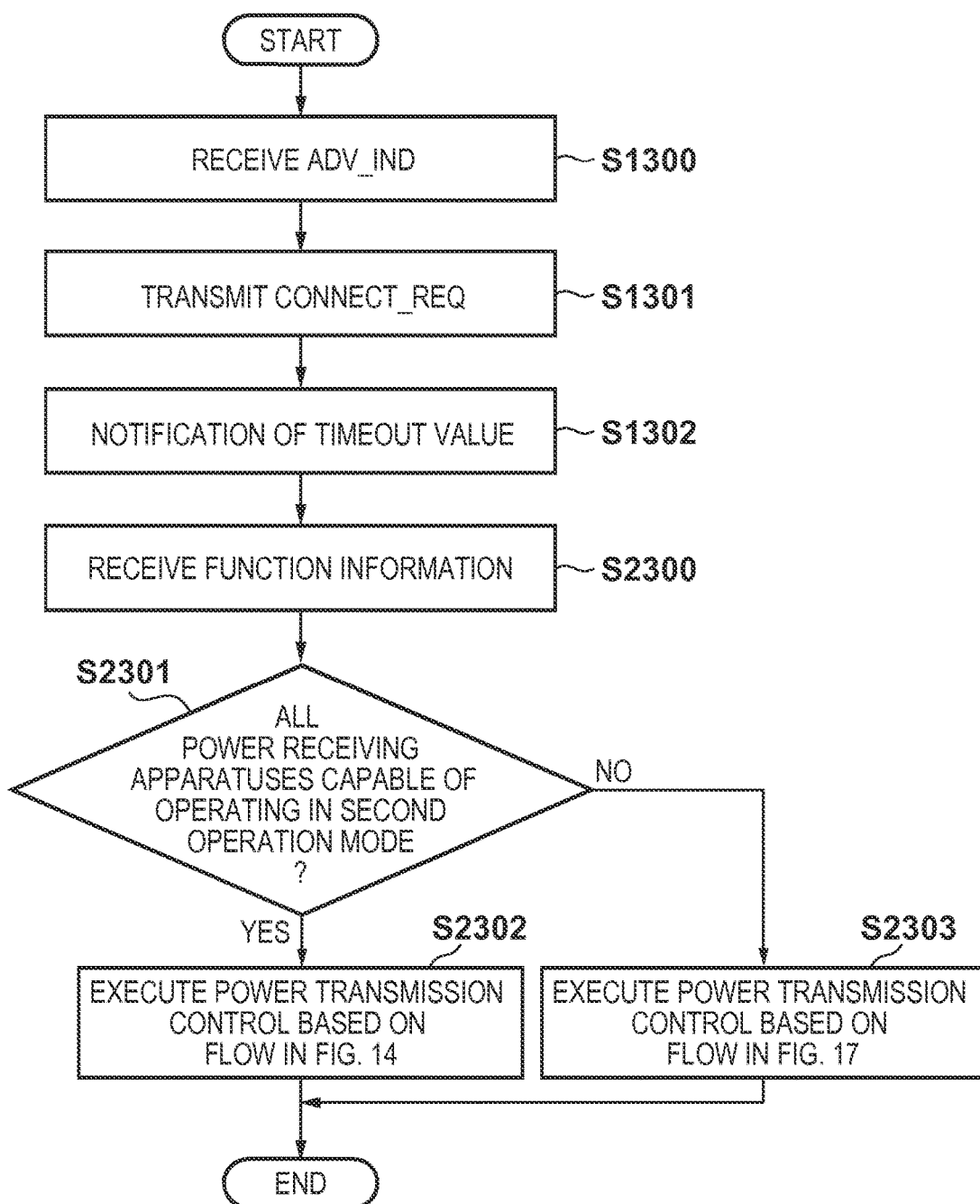
FIG. 23 is a flowchart illustrating an example of processing executed by a power transmitting apparatus according to a third embodiment.

FIG. 23 is a flowchart illustrating processing executed by the power transmitting apparatus according to the present embodiment. Note that the configurations that are the same as those described thus far will be given the same reference numerals, and descriptions thereof will be omitted. In the present embodiment, the power receiving apparatuses notify the power transmitting apparatus of function information. The "function information" includes information indicating whether the power receiving apparatus has the function for operating in the aforementioned second operating mode.

The power transmitting apparatus establishes a wireless connection with the power receiving apparatuses (S1300 to S1301), and after sharing timeout values (S1302), receives and obtains the function information from the first power receiving apparatus and the second power receiving apparatus (S2300). Note that the function information may be identified from, for example, device identification information of the power receiving apparatus (including model information, a model number, or the like of the power receiving apparatus), and in this case, the power receiving apparatus may notify the power transmitting apparatus of only the device identification information. In such a case, the power transmitting apparatus may include a table in which the device identification information and the function information are associated, and may obtain the function information by referring to that table, or may inquire with another database and obtain the function information corresponding to the received device identification information.

Here, in the case where all of the power receiving apparatuses are capable of operating in the second operating mode (YES in S2301), the power transmitting apparatus executes power transmission control based on the total power received by the power receiving apparatuses, in accordance with the flow illustrated in FIG. 14 (S2302). In this case, the power receiving apparatuses can prevent overvoltage from being applied to the internal circuitry by lowering the voltage internally through impedance matching. Accordingly, the power receiving apparatuses can supply a stable voltage to a load, and the load can continue to operate as a result, even in the case where the impedance has changed suddenly.

On the other hand, in the case where at least one of the plurality of power receiving apparatuses whose function information has been received in S2300 is not capable of operating in the second operating mode (NO in S2301), it can be thought that overvoltage can be prevented from being applied internally in at least one of the power receiving apparatuses. In other words, it can be thought that at least one of the power receiving apparatuses is not capable of internally lowering the voltage obtained through power reception and thus does not have the capability to withstand overvoltage. Accordingly, the power transmitting apparatus executes power transmission control based on the flow illustrated in FIG. 17 (or in FIG. 21) (S2303). As a result, in an environment where overvoltage may be applied to the power receiving apparatus, such overvoltage can be prevented from being applied to the power receiving apparatus by the power transmitting apparatus stopping power transmission or reducing the transmitted power.

Although the present embodiment describes notifying the power transmitting apparatus of whether or not the power receiving apparatuses have a function for operating in the second operating mode and the power transmitting apparatus then determining what operations to execute in S2301, the embodiment is not limited thereto. That is, as long as the configuration is such that the power transmitting apparatus operates according to the flow illustrated in FIG. 17 in the case where a power receiving apparatus is not capable of operating in the second operating mode, any processing may be carried out. For example, the power receiving apparatus may request the power transmitting apparatus to operate based on a function that the power receiving apparatus itself has. That is, in the case where the power receiving apparatus itself does not have a function for operating in the second operating mode, the power receiving apparatus may, in S2300, request the power transmitting apparatus to execute power transmission control based on the flow illustrated in FIG. 17. In this case, for example, the power transmitting apparatus determines whether to execute processing based on the flow illustrated in FIG. 14 or to execute processing based on the flow illustrated in FIG. 17, based on what type of request has been received from at least one of the power receiving apparatuses.

In addition, the power transmitting apparatus may notify the power receiving apparatus as to whether the power transmitting apparatus is capable of power transmission control according to the flow illustrated in FIG. 14 or of power transmission control according to the flow illustrated in FIG. 17, upon which the power receiving apparatus may determine what operations to carry out. For example, in the case where the power transmitting apparatus is not compliant with the operations indicated in the flow illustrated in FIG. 17 and the power receiving apparatus is not compliant with the second operating mode, the power receiving apparatus may execute a display that is different from a normal operating display, such as an error notification, in a display unit (not shown). The display of this error notification is, for example, a display indicating that the power receiving apparatus itself should not be placed upon the power transmitting apparatus. The error notification may be any notification that notifies a user that the power receiving apparatus should not be placed upon the power transmitting apparatus, such as a flashing pattern or a light-up color of an LED, an error sound from a speaker (not shown), or the like.

According to the present invention, an excessive voltage can be prevented from being inputted to a power receiving apparatus during wireless power transfer.

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiments of the present invention, and by a method performed by the computer of the system or apparatus by, for example, reading out and executing the computer executable instructions from the storage medium to perform the functions of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-134215, filed Jun. 26, 2013, which is hereby incorporated by reference herein in its entirety.

The invention claimed is:
1. A power transmitting apparatus comprising:
a power transmission unit configured to wirelessly transmit power to one or more power receiving apparatuses; and
a processor configured to function as:
a receiving unit configured to receive, from each of the one or more power receiving apparatuses, function information;
a determination unit configured to determine, based on the function information received from each of the one or more power receiving apparatuses, whether each of the one or more power receiving apparatuses has a function for internally lowering a voltage obtained through power reception; and
a control unit configured to control the power transmission unit to perform power transmission in a first manner in a case where the determination unit determines that at least one of the one or more power receiving apparatuses does not have the function for internally lowering the voltage obtained through power reception, and to control the power transmission unit to perform power transmission in a second manner that is different from the first manner in a case where the determination unit determines that all of the one or more power receiving apparatuses have the function for internally lowering the voltage obtained through power reception.

2. The power transmitting apparatus according to claim 1, wherein the control unit controls the power transmission unit to perform, in a case where the determination unit determines that all of the one or more power receiving apparatuses have the function for internally lowering the voltage obtained through power reception, the power transmission using a transmission power based on a total amount of received power by the one or more power receiving apparatuses in a case where the total amount of received power by the one or more power receiving apparatuses has changed by greater than a predetermined amount.

3. The power transmitting apparatus according to claim 1, wherein the control unit controls the power transmission unit to perform, in a case where the determination unit determines that all of the one or more power receiving apparatuses have the function for internally lowering the voltage obtained through power reception, the power transmission using a transmission power based on a total amount of received power by the one or more power receiving apparatuses, regardless of whether or not the total amount of received power by the one or more power receiving apparatuses has changed by greater than a predetermined amount.

4. The power transmitting apparatus according to claim 1, wherein the control unit controls, in a case where the determination unit determines that at least one of the one or more power receiving apparatuses does not have the function for internally lowering the voltage obtained through power reception and in a case where a total amount of received power by the one or more power receiving apparatuses has changed by greater than a predetermined amount, the power transmission unit to stop the power transmission or to suppress power to be transmitted so that overvoltage is not applied to the power receiving apparatus that does not have the function for internally lowering the voltage obtained through power reception.

5. The power transmitting apparatus according to claim 4, wherein the processor is further configured to function as:
a second determination unit configured to determine whether a request has been received from at least one of the one or more power receiving apparatuses to control power to be transmitted so that the overvoltage is not applied to the power receiving apparatus that transmitted the request;
wherein, in a case where the second determination unit determines that the request has been received, the control unit controls the power transmission unit so that the overvoltage is not applied to the power receiving apparatus that transmitted the request.

6. The power transmitting apparatus according to claim 4, wherein the control unit comprises:
a detection unit configured to detect, in a case where the total amount of received power has changed, whether the amount of the change is greater than the predetermined amount; and
a power transmission control unit configured to control the power transmission unit to stop the power transmission to the one or more power receiving apparatuses or to suppress the power to be transmitted to no more than a predetermined power in a case where the detection unit detects that the amount of the change is greater than the predetermined amount.

7. The power transmitting apparatus according to claim 6, wherein the control unit further comprises:

an identifying unit configured to identify a power receiving apparatus that is present in a power-transmittable range of the power transmitting apparatus and that is to receive power from the power transmitting apparatus, and to identify an amount of power to be received by the identified power receiving apparatus, while the power transmission is stopped or power to be transmitted is suppressed to no more than a predetermined power,
wherein the power transmission control unit controls the power transmission unit to perform power transmission to the identified power receiving apparatus at the identified amount of power to be received after the identifying unit has identified the amount of power to be received by the identified power receiving apparatus.

8. The power transmitting apparatus according to claim 1, wherein the power transmission unit wirelessly transmits power to two or more power receiving apparatuses.

9. A power receiving apparatus that receives power wirelessly from a power transmitting apparatus, the power receiving apparatus comprising:
a processor configured to function as:
a determination unit configured to determine, based on notification from the power transmitting apparatus, whether the power transmitting apparatus has a function for controlling power to be transmitted so that an overvoltage is not applied to the power receiving apparatus; and
a control unit configured to cause a notification unit to perform notification for causing power transmission from the power transmitting apparatus to the power receiving apparatus not to be performed, in a case where the determination unit determines that the power transmitting apparatus does not have the function for controlling power to be transmitted so that the overvoltage is not applied to the power receiving apparatus and the power receiving apparatus does not have a function for internally lowering a voltage obtained through the power reception.

10. The power receiving apparatus according to claim 9, wherein the control unit causes the notification unit to perform the notification indicating that the power receiving apparatus should not be placed upon the power transmitting apparatus.

11. The power receiving apparatus according to claim 9, wherein the notification unit is an LED, and wherein the control unit causes the notification unit to perform the notification by using at least one of a flashing pattern and a light-up color.

12. The power receiving apparatus according to claim 9, wherein the notification unit is a speaker, and
wherein the control unit causes the notification unit to perform the notification by using a sound.

13. A control method for a power transmitting apparatus that has a power transmission unit configured to wirelessly transmits power to one or more power receiving apparatuses, the method executed by a processor of the power transmitting apparatus comprising:
receiving, from each of the one or more power receiving apparatuses, function information;
determining, based on the function information received from each of the one or more power receiving apparatuses, whether each of the one or more power receiving apparatuses has a function for internally lowering a voltage obtained through power reception; and
controlling the power transmission unit to perform power transmission in a first manner in a case where it is determined in the determining that at least one of the one or more power receiving apparatuses does not have the function for internally lowering the voltage obtained through power reception, and controlling the power transmission unit to perform power transmission in a second manner that is different from the first manner in a case where it is determined in the determining that all of the one or more power receiving apparatuses have the function for internally lowering the voltage obtained through power reception.

14. A non-transitory computer-readable storage medium storing a computer program for causing a computer in a power transmitting apparatus that has a power transmission unit configured to wirelessly transmits power to one or more power receiving apparatuses to execute:

receiving, from each of the one or more power receiving apparatuses, function information;

determining, based on the function information received from each of the one or more power receiving apparatuses, whether each of the one or more power receiving apparatuses has a function for internally lowering a voltage obtained through power reception; and controlling the power transmission unit to perform power transmission in a first manner in a case where it is determined in the determining that at least one of the one or more power receiving apparatuses does not have the function for internally lowering the voltage obtained through power reception, and controlling the power transmission unit to perform power transmission in a second manner that is different from the first manner in a case where it is determined in the determining that all of the one or more power receiving apparatuses have the function for internally lowering the voltage obtained through power reception.

\* \* \* \* \*